United States Patent
Nakayama et al.

[11] Patent Number: 6,120,152
[45] Date of Patent: *Sep. 19, 2000

[54] PROJECTION-TYPE DISPLAY APPARATUS

[75] Inventors: Tadaaki Nakayama, Osaka; Yoshitaka Itoh; Akitaka Yajima, both of Suwa, all of Japan

[73] Assignee: Seiko Epson Corporation, Tokyo, Japan

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/783,236

[22] Filed: Jan. 14, 1997

Related U.S. Application Data

[63] Continuation of application No. 08/335,778, filed as application No. PCT/JP94/00419, Mar. 16, 1994, Pat. No. 5,626,409.

[51] Int. Cl.[7] .................................................. G03B 21/14
[52] U.S. Cl. .................................................. 353/31; 353/37
[58] Field of Search .................................. 353/31, 34, 37, 353/33, 38; 349/5, 8

[56] References Cited

U.S. PATENT DOCUMENTS

| | | | |
|---|---|---|---|
| 3,296,923 | 1/1967 | Miles . | |
| 4,787,737 | 11/1988 | Ogawa et al. | 353/57 |
| 4,943,154 | 7/1990 | Miyatake et al. | 353/31 |
| 5,054,910 | 10/1991 | Kozaki et al. | 353/31 |
| 5,075,798 | 12/1991 | Sonehara et al. | 353/31 |
| 5,098,184 | 3/1992 | van den Brandt et al. | 353/102 |
| 5,157,523 | 10/1992 | Yamagishi et al. | 353/31 |
| 5,270,804 | 12/1993 | Lach | 353/33 |
| 5,446,510 | 8/1995 | Mitsutake et al. | 353/34 |

FOREIGN PATENT DOCUMENTS

| | | |
|---|---|---|
| 467447 | 5/1991 | European Pat. Off. . |
| 512893 | 11/1992 | European Pat. Off. . |
| 62-237485 | 10/1987 | Japan . |
| 62-258491 | 11/1987 | Japan . |
| 63-46490 | 2/1988 | Japan . |
| 63-116123 | 5/1988 | Japan . |
| 63-121821 | 5/1988 | Japan . |
| 1-94985 | 6/1989 | Japan . |
| 2-25016 | 1/1990 | Japan . |
| 2-67312 | 5/1990 | Japan . |
| 3-152526 | 6/1991 | Japan . |
| 4-86725 | 3/1992 | Japan . |
| 4-234016 | 8/1992 | Japan . |

*Primary Examiner*—William Dowling
*Attorney, Agent, or Firm*—Oliff & Berridge, PLC

[57] ABSTRACT

A projection-type display apparatus includes a light source, a uniform illumination optical system, a color separating system for separating a white light beam emitted from the uniform illumination optical system into three color beams, three liquid crystal panels for respectively modulating each of the separated color beams, a light guide system located on an optical path of the color beam having the longest optical path among the separated color beams, a dichroic prism for synthesizing the beams modulated through the liquid crystal panels, and a projection lens for projecting the synthesized and modulated beam onto a screen. The uniform illumination optical system is provided with a uniform illumination optical device for converting the white light beam emitted from the light source into a uniform beam. Since the dichroic prism, which is an optical element that is rotationally symmetrical about the chief axis of a projection optical system, is employed as a color synthesizing system, and the uniform illumination optical device for restricting unevenness in color and luminous intensity is incorporated in the system, it is possible to realize a display apparatus which causes little unevenness in color and luminous intensity and which has a high illumination efficiency.

16 Claims, 18 Drawing Sheets

(A)

(B)

FIG. 3    ( C )
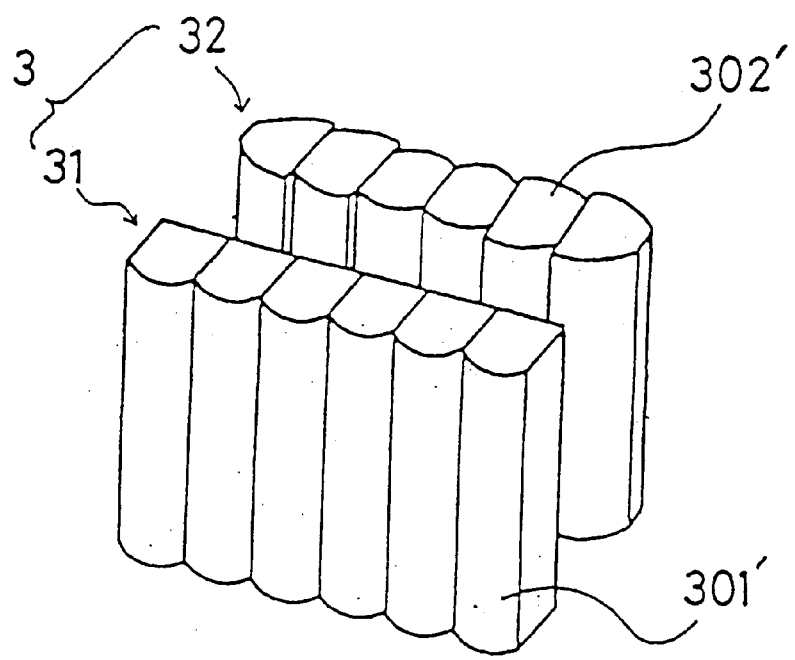

(A)

(B)

(A)

(B)

(A)

(B)

(A)

(B)

( C )

( D )

(A)

(A)

(B)

PROJECTION-TYPE DISPLAY APPARATUS

This is a Continuation of application Ser. No. 08/335,778, filed Jan. 4, 1995 (U.S. National Stage of PCT/JP94/00419 filed Mar. 16, 1994 and now U.S. Pat. No. 5,626,409.

FIELD OF THE INVENTION

The present invention relates to a projection-type display apparatus which separates a white beam from a light source into beams of three colors, red, blue and green, modulates these beams through light valves according to image information, and re-synthesizes and projects the modulated beams under magnification onto a screen through a projection lens.

DESCRIPTION OF THE RELATED ART

A projection-type display apparatus is comprised of a light source lamp, a color separating means for separating a white beam from the light source lamp into beams of three colors, three light valves for modulating the separated color beams, a color synthesizing means for synthesizing the modulated beams again, and a projection lens for magnifying and displaying a light image obtained by the synthesis onto a screen. As light valves, liquid crystal panels are generally used.

A conventional projection-type display apparatus having such structure in which a uniform illumination optical device referred to as an optical integrator is incorporated in a light source thereof is well known. For example, U.S. Pat. No. 5,098,184 discloses a projection-type display apparatus having such optical integrator incorporated therein. This patent publication also discloses a color synthesizing means consisting of dichroic mirrors arranged in the shape of an X. An ordinary color synthesizing means is constituted by dichroic mirrors each of which has a dielectric multilayer film on a glass plate.

Such projection-type display apparatus provided with a mirror composite system in which a color synthesizing means is constituted by dichroic mirrors has the following disadvantage. Each dichroic mirror is an optical element which is rotationally asymmetrical about the center axis of a projection lens. Therefore, astigmatism arises in an image on the screen, and a Modulation Transfer Function (MTF) representing the transfer characteristic of a projection optical system is lowered. As a result, the image is blurred and sharpness thereof is reduced. In a case in which the size of a liquid crystal panel is large relative to the number of pixels, in other words, when the pixel pitch is large, the lowering of the MTF does not cause such a large problem. However, when the pixel pitch is small, for example, as in a liquid crystal panel using a polysilicon TFT as a switching device, such lowering cannot be ignored.

Furthermore, a conventional projection-type display apparatus having a prism composite system in which a color synthesizing means consists of a dichroic prism is well known. The dichroic prism is an optical element which is rotationally symmetrical about the center axis of a projection lens. Therefore, astigmatism caused by this prism can be easily removed by the design of the projection lens. The MTF of the projection-type display apparatus having such a prism composite system is generally superior to that of the above-mentioned display apparatus having the mirror composite system. Accordingly, such apparatus is suitable in the case in which a liquid crystal panel having a small pixel pitch is used as a light valve.

Another type of conventional projection-type display apparatus is disclosed in, for example, U.S. Pat. No. 4,943,154. In this apparatus, the decrease in the amount of light and the unevenness in color are restricted by equalizing the optical path lengths (the distances between a light source and liquid crystal panels) of beams of three colors in a color separating means. In other words, a light transmitting means constituted by a relay lens, a field lens and so on is interposed on an optical path of the beam having the longest optical path length in the apparatus disclosed in the specification of this patent, thereby optically equalizing the optical path lengths of the color beams.

However, in this apparatus, while the light amount of the color beam having the longest optical path length is not reduced, the brightness distribution thereof is made to do a complete about-face by the relay lens. Therefore, if the initial brightness distribution is not axially symmetrical, color unevenness arises in the display on a screen, and the quality of the display is degraded. Although such color unevenness does not arise if the brightness distribution of the beam is axially symmetrical, in fact, the brightness distribution is normally made axially asymmetrical by the displacement of an attachment position of a light source lamp and the slight asymmetrical properties of the light source lamp and a reflecting mirror.

In a projection-type display apparatus, it is desirable to increase the luminous intensity of an image to be projected, and to obtain an image quality close to that of the image directly viewed on a CRT, without unevenness in color and luminous intensity. For such purpose, it is preferable to use a prism composite system having a good transfer characteristic as a color synthesizing system. It is also preferable to efficiently illuminate a liquid crystal panel with uniform brightness by using an optical integrator in a light source portion. However, if the optical integrator is used in a case in which the optical path lengths of the beams in the color separating system are different, the decrease in the amount of light and change of brightness distribution of the beam having the longest optical path are remarkable. This results in color unevenness and a change in color temperature of a projected image. Therefore, a sufficient effect of the optical integrator cannot be shown. Furthermore, when the optical integrator is used in the light source portion, the conventional art cannot be utilized as it is. In other words, since a diverged beam from a plane light source which exists in a finite position (a beam outgoing plane of the optical integrator) away from the liquid crystal panel illuminates the liquid crystal panel, the illumination with the optical integrator is basically different from the illumination from a point light source existing at an infinite distance from the liquid crystal panel, as in the arrangement of the conventional art.

SUMMARY OF THE INVENTION

An object of the present invention is to provide a projection-type display apparatus which can generate a projection image of higher quality, compared with the above-mentioned conventional projection-type display apparatus, without any unevenness in luminous intensity and color.

Another object of the present invention is to provide an inexpensive projection-type display apparatus which can generate a projection image of high quality.

Still another object of the present invention is to provide a projection-type display apparatus which can generate a projection image having higher luminous intensity than a conventional one.

A further object of the present invention is to provide a compact projection-type display apparatus which can generate a projection image of high quality.

A still further object of the present invention is to provide a projection-type display apparatus suited to be used for front projection.

In order to achieve the above objects, the present invention provides a projection-type display apparatus comprising a light source, a color separating means for separating a white light beam emitted from the light source into beams of three primary colors, three light valves for modulating the separated color beams, a light guide means located on an optical path of the color beam having the longest optical path length among the color beams separated by the color separating means and respectively incident on the three light valves, a color synthesizing means for synthesizing the color beams modulated through the light valves, and a projection lens for projecting the synthesized and modulated beam onto a screen. A uniform illumination optical means is interposed on an optical path between the light source and the color separating means for converting the white beam from the light source into a uniform rectangular beam, and for outputting the beams toward the color separating means. Three condenser lenses are located respectively in outputting portions of the color separating means for emitting the color light beams to convert the diverged beams output from the uniform illumination optical means into almost collimated beams. The color synthesizing means consists of a dichroic prism, and the light guide means is constituted by an incident side reflecting mirror, an output side reflecting mirror, and at least one lens.

In the projection-type display apparatus of the present invention having such constitution, the light valves are illuminated by the uniform illumination means, the diverged color beams are collimated by the condenser lenses respectively located on the optical paths of the color beams, and the optical path lengths of the color beams are optically equalized by making one of the color beams pass through the light guide system. Therefore, according to the present invention, it is possible to form a projection image having uniform illumination distribution, little color unevenness, and more brightness and higher quality than ever.

It is preferable that the light guide means have one intermediate lens, and that the focal length of the intermediate lens be set within a range of approximately 0.9 to 1.1 times the optical path length of the light guide means.

The light guide means may also comprise an incident lens located in the incident side of the incident side reflecting mirror, an output lens located on the output side of the output side reflecting mirror, and an intermediate lens located between the incident and output side reflecting mirrors. In this case, it is preferable that the focal lengths of the incident and output side lenses each be set between approximately 0.5 and 0.7 times the optical path length of the light guide means and that the focal length of the intermediate lens be set between approximately 0.25 and 0.4 times the optical path length of the light guide means so as to restrict any aberration.

Furthermore, in this case, it is preferable to make the optical system compact by combining the above-mentioned incident lens and the above-mentioned condenser lens (for making the collimated beam incident on the incident lens) into a single lens. If the single lens is employed, it is preferable that the lens be an aspherical lens in order to restrict aberration in the periphery thereof.

Liquid crystal panels are available as the above-mentioned light valves. In this case, it is preferable that resolution of a projection image be enhanced by setting a pixel pitch of each liquid crystal panel at approximately 50 $\mu$m or less.

On the other hand, the uniform illumination optical system may be provided with at least one lens plate consisting of a plurality of lenses arranged in a plane perpendicular to the chief axis of the light emitted from the light source lamp. In this case, it is preferable that the split number of the lens plate in one direction be set between approximately 3 and 7.

A green light beam whose amount of light is normally larger than that of other color beams, or a blue light beam in which the influence on an image quality caused by change in the amount of light is relatively difficult to detect is preferable as a color beam to be passed through the above-described light guide means.

The uniform illumination optical system may be constituted by a first lens plate, a second lens plate and a reflecting mirror interposed between the lens plates, and the optical path thereof may be folded, for example, at a right angle.

Furthermore, it is preferable that a polarized beam conversion means be located between the light source lamp and the uniform illumination optical means. The polarized beam conversion means is constituted by a polarized beam separating element for separating a random polarized beam from the light source lamp into two linearly polarized P and S beams, and a polarization plane rotating means for rotating a polarization plane of one of the two separated and polarized beams at an angle of 90° so as to coincide with that of the other linearly polarized beam. Since the use of the polarized beam conversion means makes it possible to enhance the use efficiency of light emitted from the light source lamp, the luminous intensity of a projection image can be increased.

The projection-type display apparatus of the present invention is characterized in that the above light guide system is provided with an incident side triangular prism located on the incident side for folding an optical path at a right angle, an output side triangular prism located on the output side for folding the optical path at a right angle, and a light guide member located between these triangular prisms. Even in the projection-type display apparatus having such constitution, it is possible to form a projection image with uniform illumination distribution, little color unevenness and more brightness and higher quality than ever.

As the light guide member, a quadratic prism may be used. It is preferable that interfaces of the triangular prism and the quadratic prism be covered with an anti-reflective coating. Furthermore, it is preferable that a total reflection surface of each triangular prism be coated with a metal film or a dielectric multilayer film.

Another projection-type display apparatus of the present invention is suited to be used as a front projector, and comprises a light source, a color separating means for separating a white light beam emitted from the light source into beams of three primary colors, three light valves for modulating the separated color beams, a light guide means located on the optical path of the color beam having the longest optical path length among the color beams separated by the color separating means and respectively incident on the three light valves, a color synthesizing means for synthesizing the color beams modulated through the light valves, a projection lens means for projecting the synthesized and modulated beam onto a screen, and a uniform illumination optical means located on an optical path between the light source and the color separating means for converting the white beam from the light source into a uniform rectangular beam and for emitting the beam into the color separating means. Three condenser lenses are located respectively in emitting portions of the color separating means for emitting the color light beams so as to convert the diverged beam output from the uniform illumination optical means into almost collimated beams. The color synthesizing means is constituted by a dichroic prism. The light guide means comprises an incident side reflecting mirror, an output side reflecting mirror, and at least one lens. The optical path is formed so that the direction of the beam from the projection lens is parallel and reverse to the onward direction of the light beam emitted from the light source. A cooling means for the light source is located on the output side of the projection light in an apparatus case. A vent for the cooling means is formed on a side surface of the case on the output side of the projection light.

According to such constitution, since the cooling means is located on the reverse side to a viewer of a projection image, it is advantageous in preventing noises and exhausted air from the cooling means from disturbing the viewer.

DETAILED DESCRIPTION OF THE EMBODIMENT

Embodiments of the present invention will be described below in reference to the drawings.

First Embodiment

Figure 1:
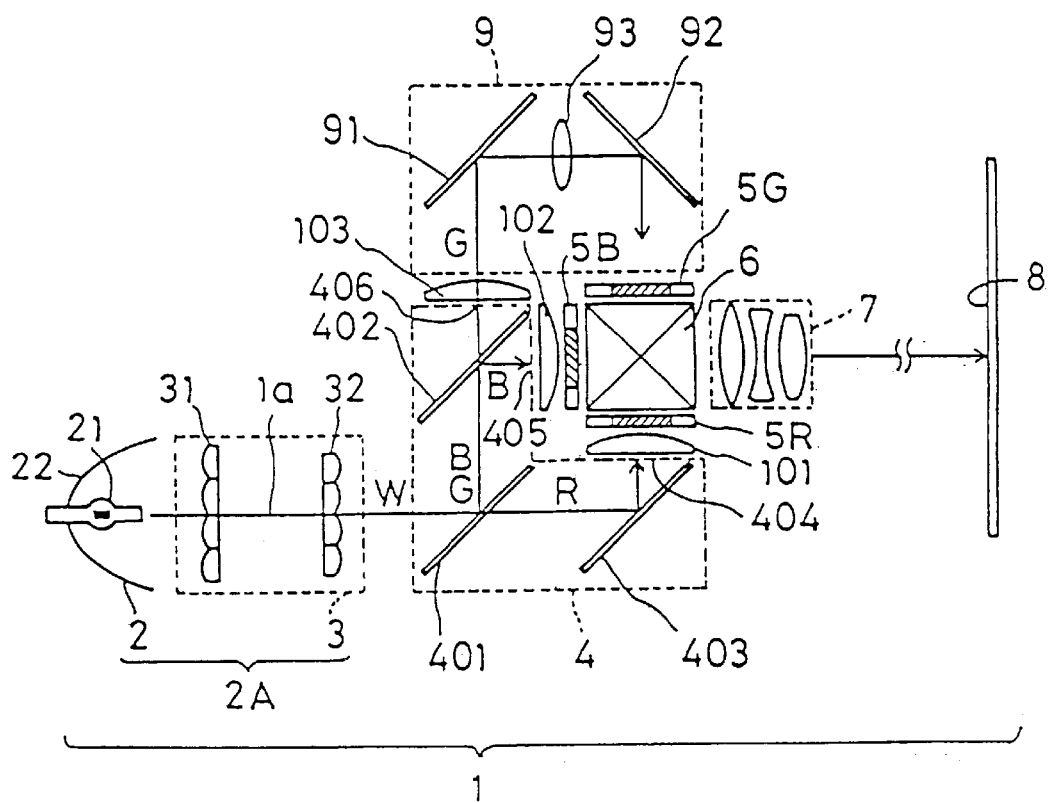
FIG. 1 is a schematic view showing a general constitution of a projection-type display apparatus according to a first embodiment of the present invention.

FIG. 1 shows an optical system of a projection-type display apparatus according to a first embodiment of the present invention. A projection-type display apparatus 1 in this embodiment is comprised of an illumination optical system 2A constituted by a light source 2 and a uniform illumination optical device 3, a color separating optical system 4 for separating a white beam W output from the illumination optical system 2A through the uniform illumination optical device 3 into color beams R, G and B of red, green and blue, three liquid crystal panels 5R, 5G and 5B as light valves for modulating the color beams, a color synthesizing optical system 6 for synthesizing the modulated color beams again, and a projection lens 7 for magnifying and projecting the synthesized beam onto a screen 8. There is also provided a light guide system 9 for guiding the green beam G among the color beams, separated by the color separating optical system 4, to the liquid crystal valve 5G.

The light source 2 in this embodiment is constituted by a light source lamp 21 and a curved reflecting mirror 22. As the light source lamp 21, a tungsten halogen lamp, a metal halide lamp, a xenon lamp and so on can be used. Though the details of the uniform illumination optical system 3 will be described below, the optical system 3 is constituted by first and second lens plates 31 and 32 arranged on a plane perpendicular to a chief axis 1a thereof.

The color separating optical system 4 is constituted by a blue/green reflecting dichroic mirror 401, a blue reflecting dichroic mirror 402 and a reflecting mirror 403. The blue and green beams B and G contained in the white beam W are reflected at a right angle by the blue/green reflecting dichroic mirror 401, and directed toward the blue reflecting dichroic mirror 402. The red beam R passes through this mirror 401, is reflected at a right angle by the reflecting mirror 403, and is output from an outputting portion 404 for the red beam toward the color synthesizing optical system. As for the blue and green beams B and G reflected by the mirror 401, only the blue beam B is reflected at a right angle by the blue reflecting dichroic mirror 402, and output from an outputting portion 405 for the blue beam toward the color synthesizing optical system. The green beam G passes through the mirror 402, and is output from an outputting portion 406 for the green beam toward the light guide system 9. In this embodiment, the distances between the outputting portion of the uniform illumination optical device 3 for the white beam and the outputting portions 404, 405 and 406 for the color beams in the color separating optical system 4 are set to be equal.

In this embodiment, condenser lenses 101, 102 and 103, each of which consists of a planoconvex lens, are respectively located on the outputting sides of the outputting portions 404, 405 and 406 of the color separating optical system 4 for the color beams. Therefore, the color beams output from the outputting portions come into the condenser lens 101–103 to be collimated.

The red and blue beams R and B, among the collimated color beams R, G and B, come into the liquid crystal panels 5R and 5B located just behind the condenser lenses 101 and 102, and are modulated and applied with image information corresponding to the respective color beams. In other words, switching control operations are performed according to the image information by unillustrated drive means in these liquid crystal panels, thereby modulating the color beams passing therethrough. As such drive means, a well-known type of drive means can be used as is, and the explanation thereof is omitted in this embodiment. On the other hand, the green beam G is guided to the corresponding liquid crystal panel 5G through the light guide system 9, and modulated according to image information in the same manner as above. Each of the liquid crystal panels employed in this embodiment has a pixel pitch of 50 $\mu$m or less, and uses a polysilicon TFT as a switching device.

The light guide system 9 in this embodiment is constituted by an incident side reflecting mirror 91, an output side reflecting mirror 92 and an intermediate lens 93 located between the reflecting mirrors 91 and 92. In this embodiment, the focal length of the intermediate lens 93 is set to be equal to the total optical path length of the light guide system 9. The focal length can be set within a range of approximately 0.9 to 1.1 times of the total optical path length of the light guide system 9. Among the optical path lengths of the color beams, that is, the distances between the light source lamp 21 and the liquid crystal panels, the distance of the green beam G is the longest, and therefore, the green beam G loses the most amount of light. However, the interposition of the light guide system 9 in this embodiment can restrict the loss in the amount of light. Therefore, the optical path lengths of the color beams can be substantially equalized. A color beam passing through the light guide system 9 may be red or blue. However, since the amount of green light is more than those of other colors in an ordinary projection-type display apparatus, it is generally preferable to assign the green beam to the optical path passing through the light guide system 9. If brightness or evenness in image quality takes priority over color balance, it is allowable to assign the blue beam, which has a low spectral luminous efficacy and in which unevenness in luminous intensity is relatively difficult to detect, to the light guide system 9.

The color beams modulated by the respective liquid crystal panels 5R, 5G and 5B are made incident on the color synthesizing optical system 6. The color synthesizing optical system 6 consists of a dichroic prism in this embodiment. As the color synthesizing optical system, a mirror composite system having dichroic mirrors arranged in the shape of an X may be employed. However, in a projection-type display apparatus having a color synthesizing system which has a mirror composite system comprised of dichroic mirrors, each of the dichroic mirrors is an optical element which is rotationally asymmetrical about the chief axis of a projection lens. Therefore, astigmatism arises in an image on a screen, and the Modulation Transfer Function (MTF) of the projection optical system is lowered. As a result, the image is blurred and sharpness thereof is reduced. In a case in which the size of a liquid crystal panel is large relative to the number of pixels, in other words, when the pixel pitch is large, the lowering of the MTF does not cause a large problem. However, when the pixel pitch is small, such as in the case of a liquid crystal panel using a polysilicon TFT as the switching device in this embodiment, such lowering cannot be ignored. Since the dichroic prism is used as the color synthesizing optical system 6 in this embodiment, such a bad effect can be avoided.

Figure 2:
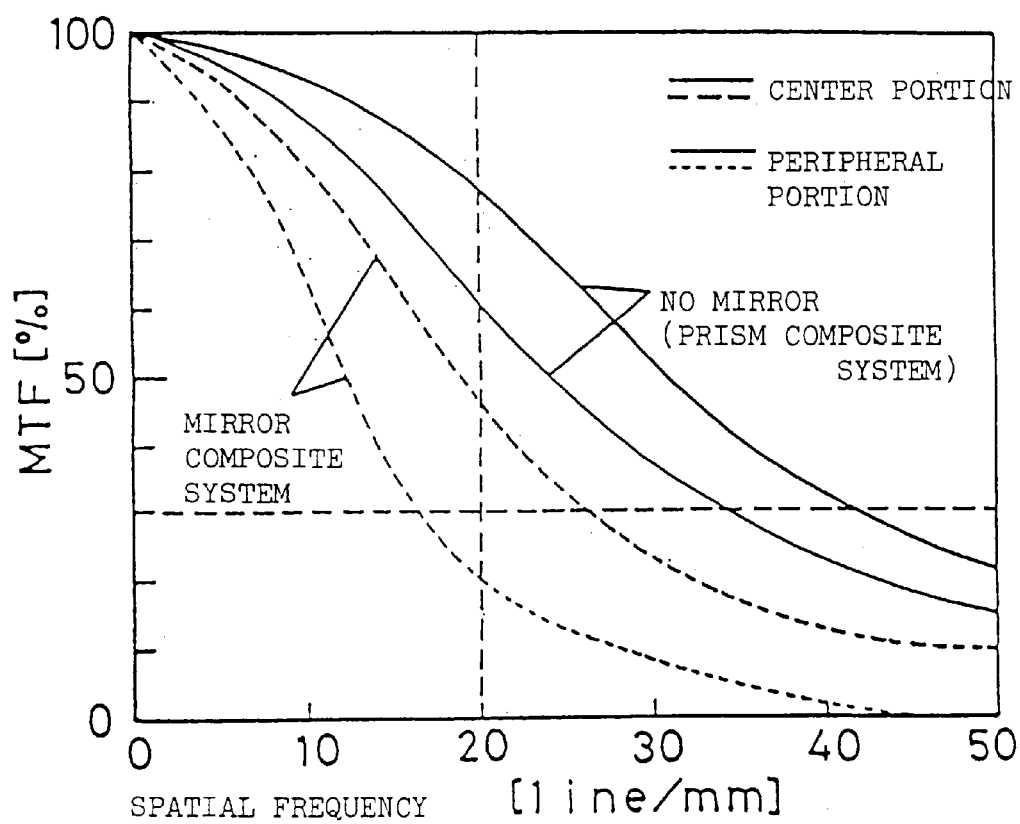
FIG. 2 is a graph showing the relationship between the pixel density and the transfer characteristic (MTF) of a liquid crystal panel used as a light valve in the projection-type display apparatus.

That point will now be described with reference to FIG. 2. This figure shows MTF characteristics for projection-type display apparatus having a prism composite system in this embodiment, and for a projection-type display apparatus having a mirror composite system as a color synthesizing system. Referring to the figure, the horizontal axis indicates the spatial frequency (line/mm) representing the fineness of pixels of the display panel, and the vertical axis indicates MTF characteristics (%). Solid lines each indicate the characteristic of the projection optical system with the prism composite system. A bold solid line indicates the characteristic of the center portion of an image plane, and a thin solid line indicates that of the peripheral portion of the image plane. Similarly, broken lines each indicate the characteristic of the projection optical system with the mirror composite system. A bold broken line indicates the characteristic of the center portion of the image plane, and a thin broken line indicates that of the peripheral portion of the image plane.

In the case of the mirror composite system, since the mirror is inserted at an angle of 45 degrees, astigmatism arises, thereby lowering the MTF characteristic of the projection lens alone. In the case of a liquid crystal panel using a polysilicon TFT as a switching device and having a pixel pitch of less than 50 $\mu$m, a MTF characteristic of more than 30% is necessary relative to a spatial frequency of 20 (line/mm). However, it is apparent that a sufficient MTF characteristic cannot be obtained in the peripheral portion of the image plane when the mirror composite system is used. On the other hand, when the prism composite system is used in this embodiment, the MTF characteristic is not lowered since astigmatism caused by the prism can be removed by the design of the projection lens.

In the apparatus of this embodiment, the color beams are synthesized in the color synthesizing system consisting of a dichroic prism, and an optical image can be obtained and projected onto the screen 8 by the projection lens 7 under magnification. A lens close to a telecentric system is preferable as a projection lens. (Illumination Optical System)

An optical integrator lens generally used in an exposer is suitable for the uniform illumination optical device 3 in the illumination optical system of this embodiment. The basic structure of the uniform illumination optical device 3 used in the projection-type display device is illustrated in FIG. 3(A). As shown in this figure, the uniform illumination optical device 3 consists of the first and second lens plates 31 and 32. The first lens plate 31 is formed from a matrix of a plurality of rectangular lenses 301, and the second lens plate 32 is similarly formed from a plurality of rectangular lenses 302. Each of the rectangular lenses 301 of the first lens plate 31 is shaped similarly to the liquid crystal panel to be illuminated. Images on these rectangular lenses 301 are superimposed onto the liquid crystal panel by the corresponding rectangular lenses 302 constituting the second lens plate 32. Therefore, the liquid crystal panel is illuminated with uniform illumination and little color unevenness.

In this embodiment, the rectangular lenses in the lens plates 31 and 32 are respectively arranged in a 4 by 3 matrix. It is preferable that the most split number of the lens plates in the vertical or horizontal direction be within a range of approximately 3 to 7. Furthermore, it is not always necessary to separate the first and second lens plates 31 and 32.

These lens plates 31 and 32 can be brought closer together by making the size of each rectangular lens smaller and increasing the split number of the incident beam. Furthermore, the lens plates 31 and 32 may be combined into a single lens plate.

Figure 4:
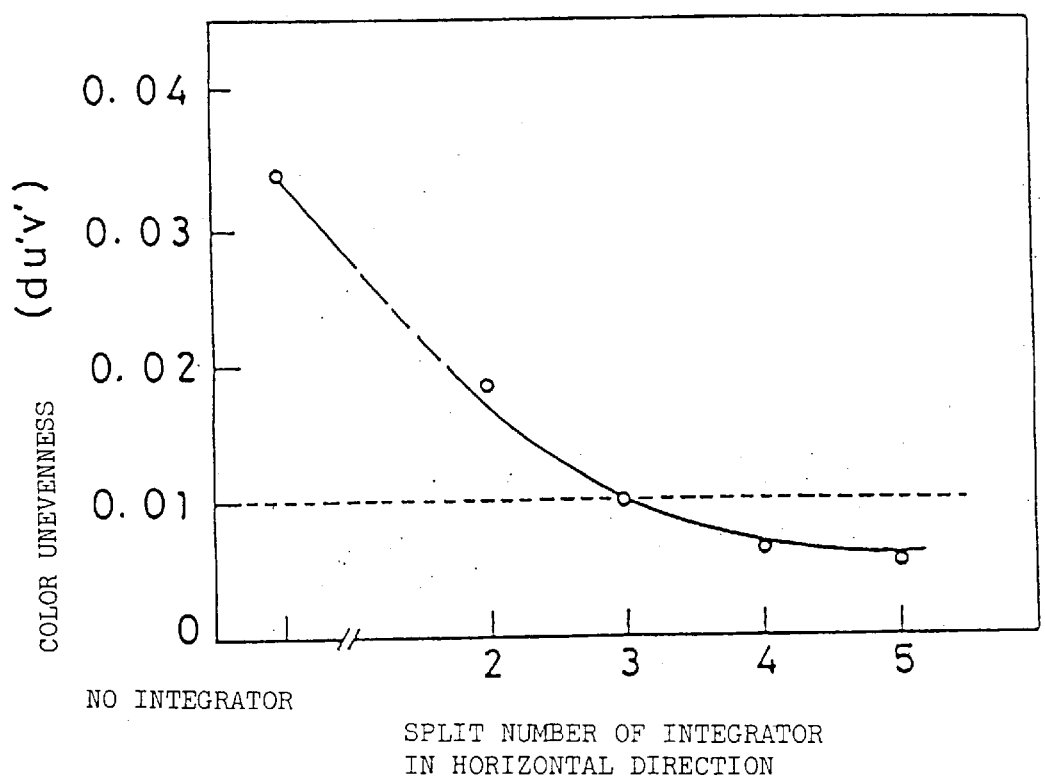
FIG. 4 is a graph showing the relationship between the split number of the lens plates of the uniform illumination optical device and color unevenness.

Referring to FIG. 4, the relationship between the split number of the rectangular lenses of the lens plates 31 and 32 constituting the uniform illumination optical device 3 and color unevenness will be described. In a graph shown in FIG. 4, the horizontal axis indicates the split number of the first and second lens plates (integrator lenses), and the vertical axis indicates color unevenness, differences in color among the center portion (1 portion) and the peripheral portions (4 portions) on the screen 8, as differences on a U'V' chromaticity coordinate. The smaller the value indicating color unevenness, the smaller the degree of color unevenness. In the figure, a value indicated by a broken line is the largest color unevenness which is regarded as permissible as color unevenness.

As shown in this graph, it is preferable that the split number be 3 or more. However, the increase of the split number leads to an increase in cost from the viewpoint of production. Therefore, a practical split number is within a range of approximately 3 to 7.

FIG. 3(B) illustrates another arrangement example of the first and second lens plates 31 and 32 constituting the uniform illumination optical device 3. In the example shown in this figure, each of the lens plates is also constituted by rectangular lens plates of the same size. However, as for the arrangement of the rectangular lenses, the split number in the vertical direction is 7. The split number in the horizontal direction is 3 in the top and bottom lines, 5 in the center three lines and 4 in other lines.

The uniform illumination optical device 3 may be constituted by a first lens plate 31 consisting of a plurality of cylindrical lenses 301' and a second lens plate 32 consisting of a plurality of cylindrical lenses 302' as shown in FIG. 3(C). In this case, the luminous intensity is made uniform only in one direction, and the luminous intensity of the center of an object to be illuminated is higher than those of the cases shown in FIGS. 3(A) and (B). Furthermore, the arrangement of the lenses is relatively simple, thinning of the lenses can be easily performed.

The operation in illuminating the liquid crystal panels 5R, 5G and 5B by the uniform illumination optical device 3 having the above-mentioned arrangement will now be described with reference to FIG. 5(A). As mentioned above, a light emitting source close to a point source, such as a tungsten halogen lamp, a metal halide lamp, a xenon lamp and so on, is employed as the light source 2. The beam emitted from the lamp is reflected by the reflecting mirror 22. The shape of the reflection plane of the reflecting mirror 22 may be elliptical, and in this case, a first focus is made coincident with the emitting portion of the light source lamp 21 and the second focus is made coincident with the center of the liquid crystal panel 5 (5R, 5G and 5B). As a result, the beam reflected by the reflecting mirror 22 advances toward the center of the liquid crystal panel 5. In this case, the size of the second lens plate 32, that is, the size of each of the rectangular lenses 302 constituting the lens plate 32, is set smaller than that of the first lens plate 31 so that the center of each rectangular lens 302 of the second lens plate 32 is positioned on a line between the center of each corresponding rectangular lens 301 of the first lens plate 31 and the center of the liquid crystal panel 5.

Each of the rectangular lenses 301 of the first lens plate 31 condenses the beam onto the center of the corresponding rectangular lenses 302 of the second lens plate 32. The rectangular lenses 302 of the second lens plate 32 superimpose images on the corresponding rectangular lenses 301 of the first lens plate 31 onto a display area 5A (an area diagonally shaded in the figure) of the liquid crystal panel 5. Since the image in the outputting portion of the light source lamp 21 is thus formed on the center of each rectangular lens 302 of the second lens plate 32, the whole second lens plate 32 functions as a secondary light source. Therefore, for example, a chief ray 303 of a beam incident on the end of the display area 5A of the liquid crystal panel 5 coincides with a line which links the center of the second lens plate 32 and the end of the display area 5A. In other words, since the illumination beam to the liquid crystal panel 5 is a diverged beam from the second lens plate 32, it is necessary to collimate the diverged beam in order to make a collimated beam incident on the liquid crystal panel 5. The condenser lenses 101, 102 and 103 are arranged in this embodiment to serve that purpose. The focal length of each condenser lens is set equal to a distance b between the second lens plate 32 and the condenser lens. In this embodiment, a planoconvex lens which is located with a convex plane facing the liquid crystal panel 5 is used as the condenser lens. The convex plane may be set to face the second lens plate 32. A double-convex lens or a Fresnel lens may be used instead of the planoconvex lens. Thus, the chief ray of the beam output through the liquid crystal panel 5 is made parallel to the center axis 1a of the whole illumination optical system through the use of the condenser lenses 101, 102 and 103.

Figure 5:
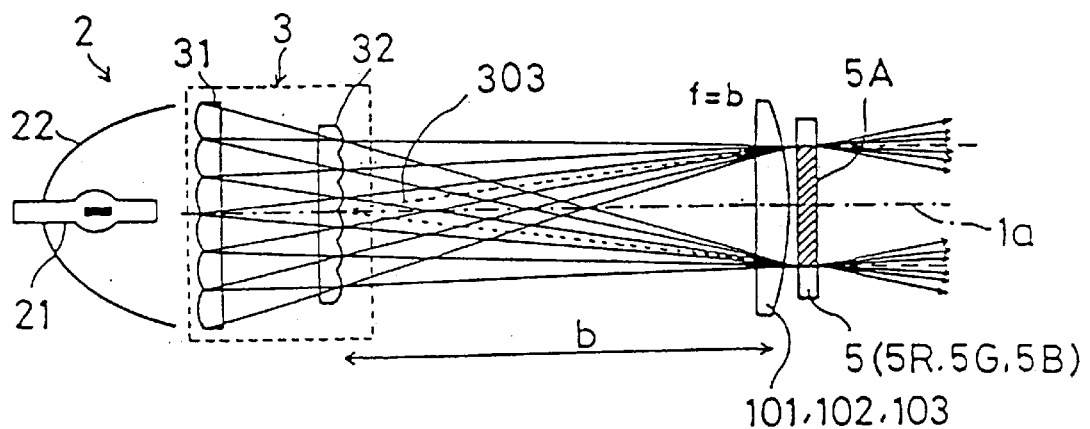
FIGS. 5(A) and (B) each are diagrams explaining the operation of the uniform illumination optical device.
Figure 5:
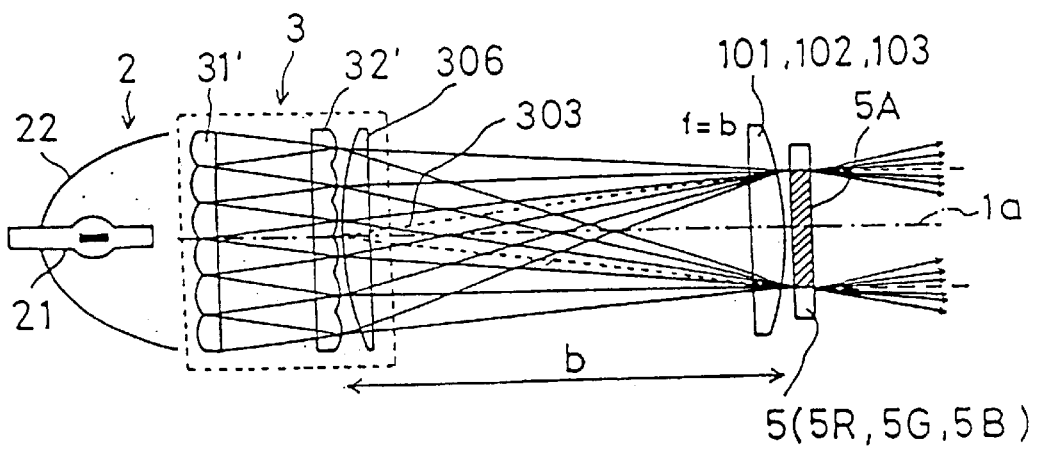

FIG. 5(B) illustrates a variation of the illumination optical system. In this variation, a parabolical plane is used as a reflection plane of the reflecting mirror 22 of the light source 2. Since the focus of the parabolical plane is made coincident with the emitting portion of the light source lamp 21 in this case, a beam reflected by the reflecting mirror 22 is almost parallel to the center axis 1a of the illumination system. Therefore, the uniform illumination optical device 3 used in this case is constituted by first and second lens plates 31' and 32' of the same size, and rectangular lenses constituting the lens plates each have the same focal length. Rectangular lenses 302' of the second lens plate 32' form an image on corresponding rectangular lenses of the first lens plate 31' at an infinite distance. Therefore, a lens 306 is added in this case in order to form the image to be formed at an infinite distance onto the display area 5A of the liquid crystal panel 5. The focal length of the lens 306 is set to be equal to the distance between the lens 306 and the liquid crystal panel 5. The lens 306 may be integrally formed with the second lens plate 32.

Figure 13:
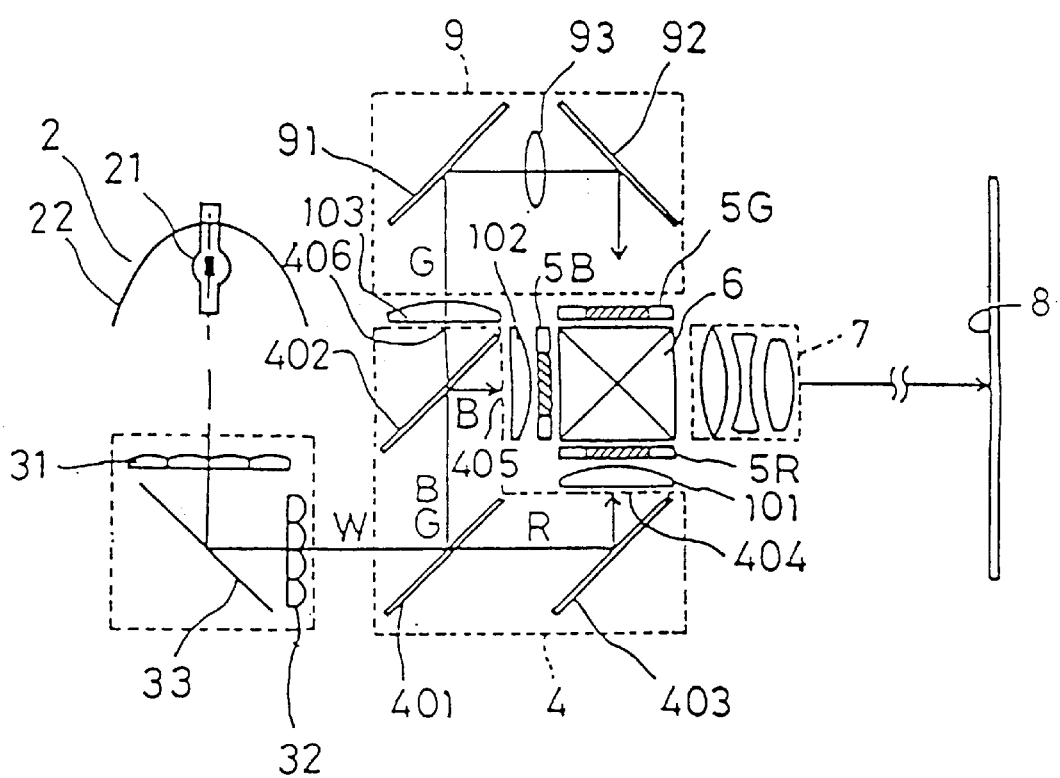
FIG. 13 is a schematic structural view showing a variation of the uniform illumination optical device shown in FIG. 1.

When the split number by the rectangular lenses of the lens plates 31 and 32 is relatively small, the distance between the lens plates 31 and 32 can be relatively long, and a reflecting mirror 33 can be interposed between the lens plates 31 and 32 as shown in FIG. 13. In this case, it is advantageous that the volume of the uniform illumination optical system is almost half of that in the above embodiment. Furthermore, all the optical systems can be arranged in an area close to a square as shown in the figure, and it contributes to downsizing of the whole apparatus.

Light Guide System

As mentioned above, the light guide system 9 in this embodiment is constituted by the two reflecting mirrors 91 and 92 and the intermediate lens 93 located therebetween. Another arrangement of the light guide system applicable to this embodiment will now be described below.

Figure 6:
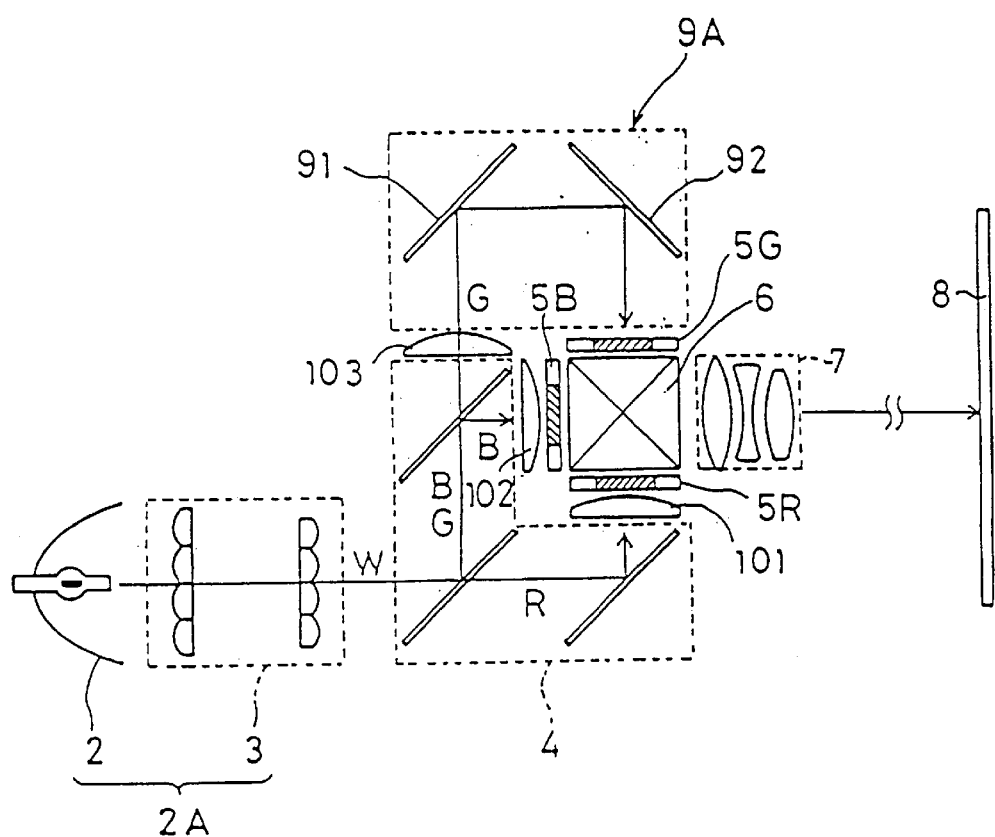
FIG. 6 is a schematic structural view showing a variation of a light guide system in the first embodiment of the present invention.

A light guide system 9A shown in FIG. 6 has the arrangement obtained by omitting the intermediate lens 93 from the light guide system 9 in this embodiment.

Figure 7:
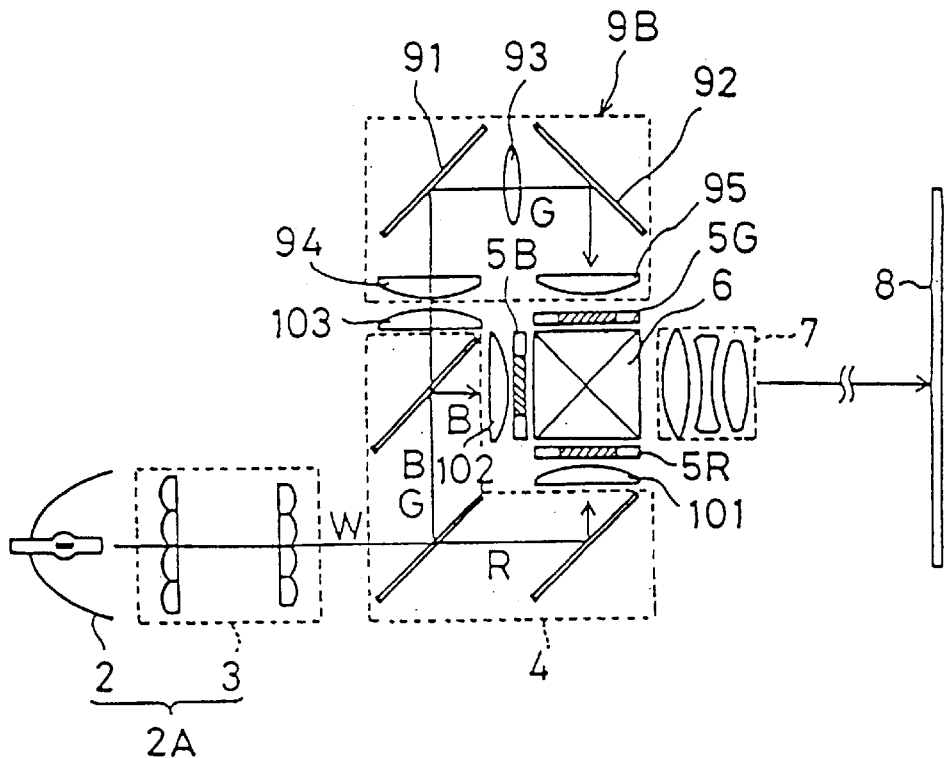
FIGS. 7(A) and (B) are, respectively, a schematic structural view showing another variation of the light guide system of the first embodiment of the present invention, and an explanatory view of the operation thereof.
Figure 7:
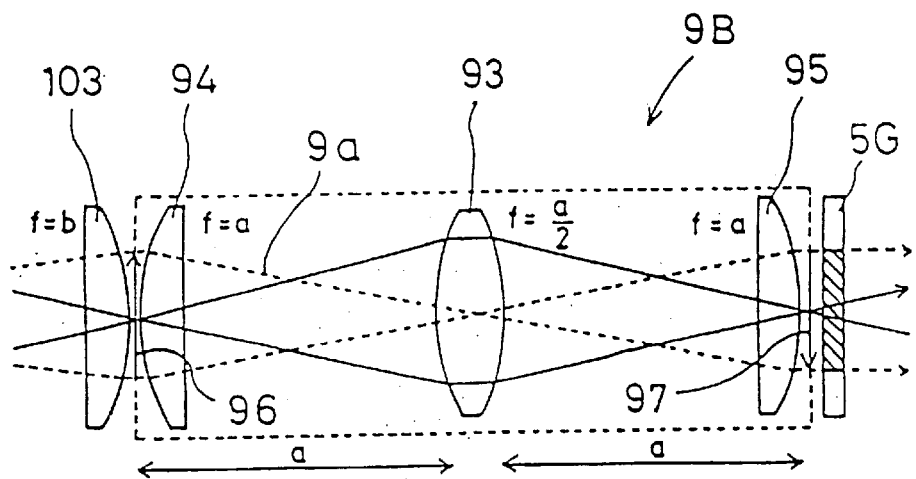

A light guide system 9B shown in FIG. 7(A) has the arrangement in which an incident lens 94 is added on the incident side thereof and an outputting lens 95 is added on the output side thereof besides the arrangement of the light guide system 9 in this embodiment.

Referring to FIG. 7(B), the operation of the light guide system 9B having such arrangement will now be described. In the figure, a linear system is employed without a pair of reflecting mirrors 91 and 92 in order to make the description plain. As shown in the figure, the intermediate lens 93 is located just at the center of the whole optical path of the light guide system 9B, and when it is assumed that the total optical path length is 2a, the focal length of the intermediate lens 93 is set to be almost equal to a/2. Therefore, the intermediate lens 93 forms an image of an object 96 on the incident side of the light guide system 9B onto the output side thereof as a reversed image 97. In other words, the illumination distribution on the incident side is transferred with a 180-degree turn on the emission side. However, since the illumination optical system provided with the uniform illumination optical device 3 is employed in this embodiment, the illumination distribution is almost symmetrical about the 180-degree turn. Therefore, even if the illumination distribution is turned or reversed, no color unevenness arises on the display.

On the other hand, the incident lens 94 has a focal length which equals a distance a to the intermediate lens 93, and directs a main ray 9a of the beam G collimated through the condenser lens 103 toward the center of the intermediate lens 93. Therefore, an image on the second lens plate 32 on the output side of the uniform illumination optical device 3 is formed in the center of the intermediate lens 93. Furthermore, the outputting lens 95 also has a focal length set to be equal to a, and collimates and outputs the chief ray of the diverged beam output from the center of the intermediate lens 93. The incident lens 94 is, as shown in the figure, a planoconvex lens, and is located with a convex side thereof facing the incident side, thereby decreasing its spherical aberration. The output lens 95 is also a planoconvex lens located with a convex side thereof facing on the output side.

It is preferable that the focal lengths of the incident lens 94 and the output lens 95 be each set within a range of approximately 0.5 to approximately 0.7 times of the total optical path length (2a) of the light guide system 9B. In order to decrease the spherical aberration, it is preferable that the focal length of the intermediate lens 93 be a little longer than ¼ of the total optical path length (2a), and be set within a range of approximately 0.25 to approximately 0.4 times of the total optical path length.

Figure 8:
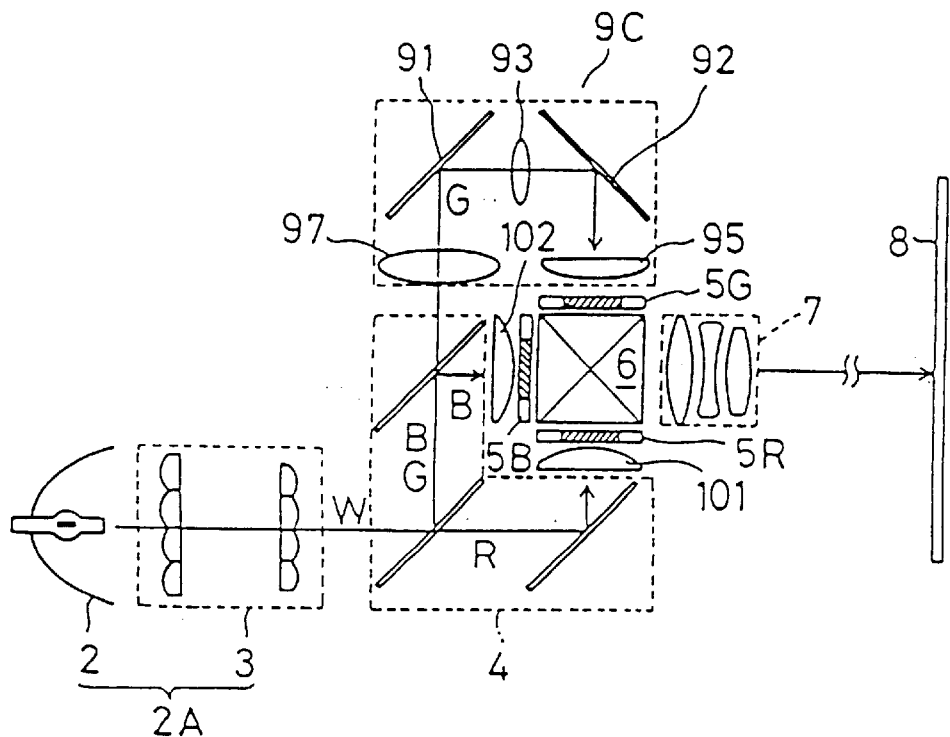
FIGS. 8(A) and (B) are, respectively, a schematic structural view showing a further variation of the light guide system of the first embodiment of the present invention, and an explanatory view of the operation thereof.
Figure 8:
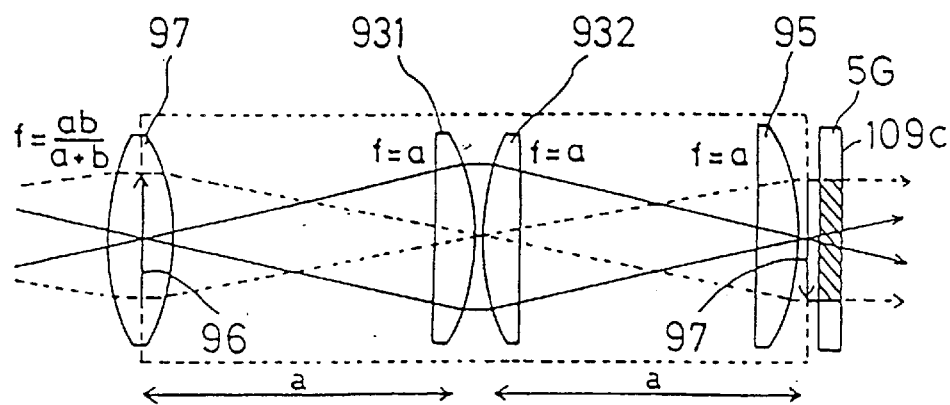

FIG. 8(A) illustrates a variation of the above-mentioned light guide system 9B. In a light guide system 9C shown in this figure, there is provided a lens 99 made by integrally forming the incident lens 94 and the condenser lens 103 located on this side in the direction of the optical path in the light guide system 9B. The focal length of the lens 99 is set at a value obtained by adding the refracting powers of the incident lens 94 and the condenser lens 103, in short, ab/(a+b) as shown in FIG. 8(B). It is preferable that the lens 99 be a double-convex lens in order to reduce spherical aberration. In FIG. 8(B), the intermediate lens 93 is constituted by two planoconvex lenses 931 and 932. As shown in the figure, the focal length of each of the planoconvex lenses 931 and 932 is set at a. By locating the lenses 931 and 932 so that convex planes thereof face each other, spherical aberration can be made extremely smaller than that in use of a single double-convex lens. As a result, it is possible to transfer the illumination distribution on the incident side of the light guide system to the outputting side with extreme precision.

Figure 9:
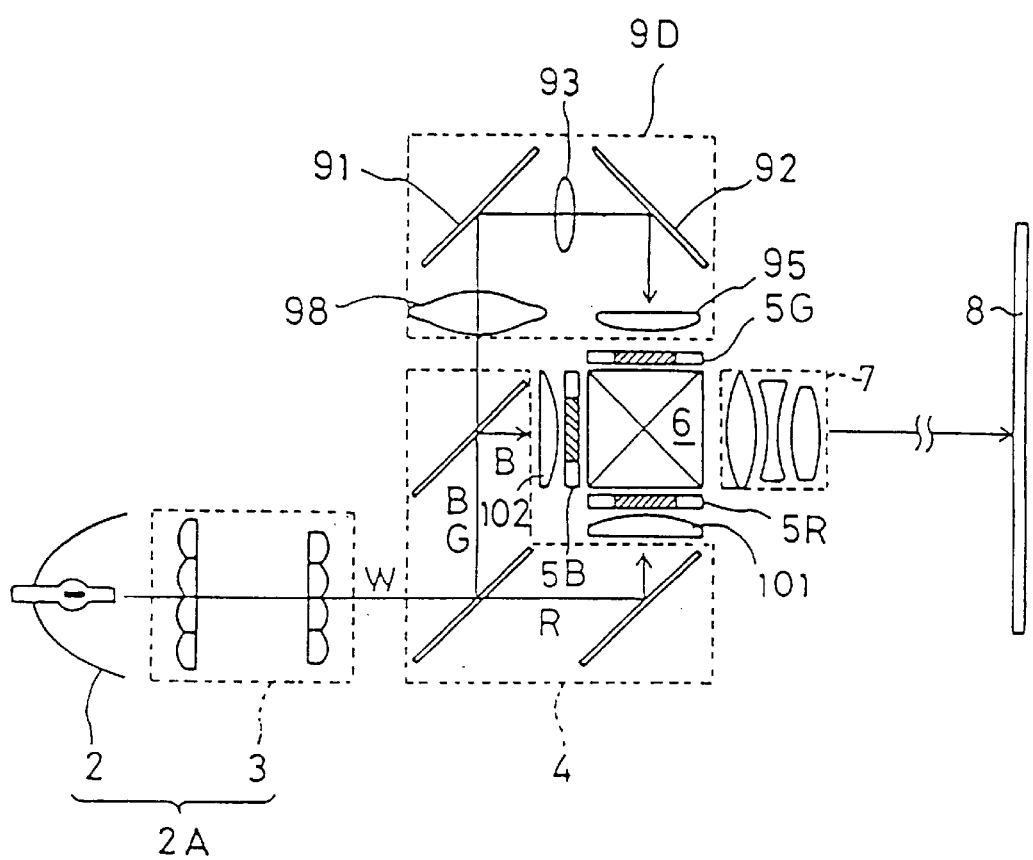
FIG. 9 is a schematic structural view showing a variation of the light guide system shown in FIG. 8(A)

FIG. 9 illustrates a variation of the light guide system 9C. In an illustrated light guide system 9D, an aspherical lens 98 is employed instead of the integrated lens 99 in the above light guide system 9C. The use of the aspherical lens makes spherical aberration even smaller than that in use of the double-convex lens. Therefore, the illumination distribution on the incident side of the light guide system can be transferred to the output side with extreme precision.

Advantage of First Embodiment

As described above, in the projection-type display apparatus 1 of this embodiment, the employed illumination optical system is provided with the uniform illumination optical device 3, and a dichroic prism, which is an axially symmetrical optical device, is used as the color synthesizing optical system. Therefore, it is possible to realize a projection-type display apparatus in which unevenness in color and luminous intensity is small and the illumination efficiency is high. Furthermore, since the color synthesizing system including a dichroic prism is used, the focal length of the projection lens can be shortened, and a large-scale display at a short distance can be performed. Consequently, the application of the constitution of this embodiment to a rear projector makes it possible to shorten the depth of the projector, and to make the projector compact.

Furthermore, since the focal lengths of the intermediate lens, the incident lens and the outputting lens, which are optical devices constituting the light guide system, are set at proper values, it is possible to decrease the occurrence of color unevenness and the loss in the amount of light of the color beams passing through those optical devices, thereby restricting unevenness in color and luminous intensity of a projection image, and forming a bright image.

Still furthermore, when the incident lens and the outputting lens are integrally formed in the light guide system, since the number of components can be reduced, the optical system can be compact and inexpensive. If the integrated lens is replaced with an aspherical lens, it is possible to make the optical system compact and reduce spherical aberration.

On the other hand, in this embodiment, since the split number in the uniform illumination optical device is set within a range of 3 to 7, and the pixel pitch of the liquid crystal panel is set to less than 50 $\mu$m, color unevenness, blurring and so on of the projection image can be restricted. Therefore, it is possible to realize a projection-type display apparatus capable of forming a projection image of high quality.

Second Embodiment

Figure 10:
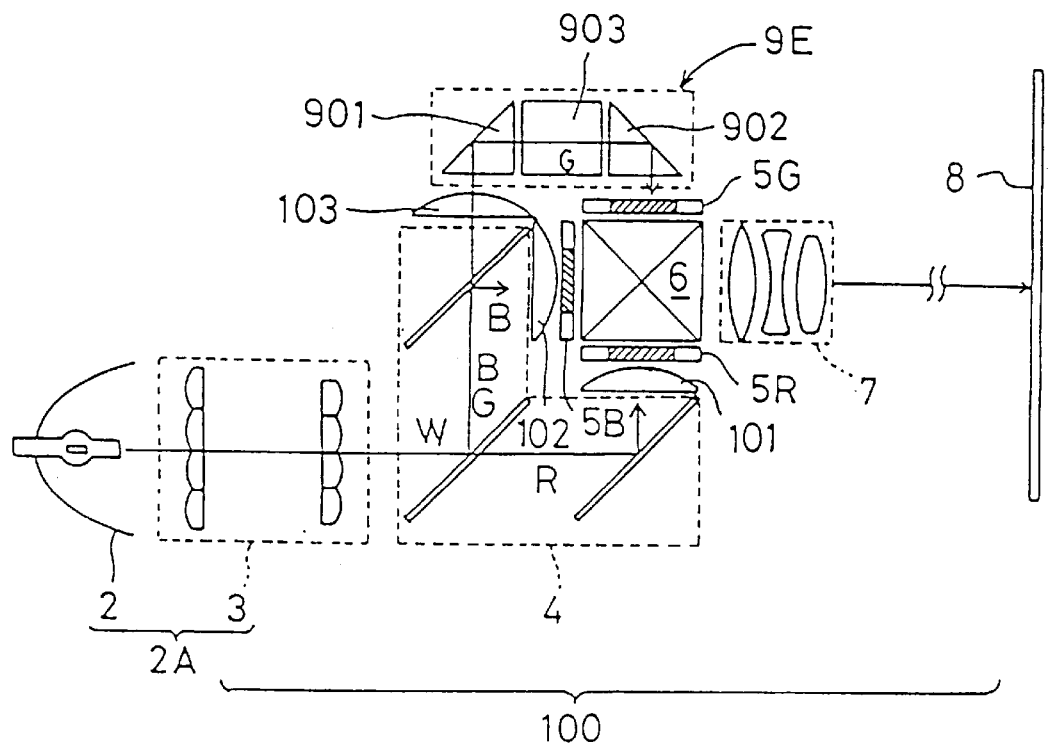
FIGS. 10(A) and (B) are, respectively, a schematic structural view showing an optical system in a projection-type display apparatus according to a second embodiment of the present invention, and an explanatory view showing a light guide system therein.
FIGS. 10(C) and (D) are explanatory views showing variations of the light guide system shown in FIG. 10(B)
Figure 10:
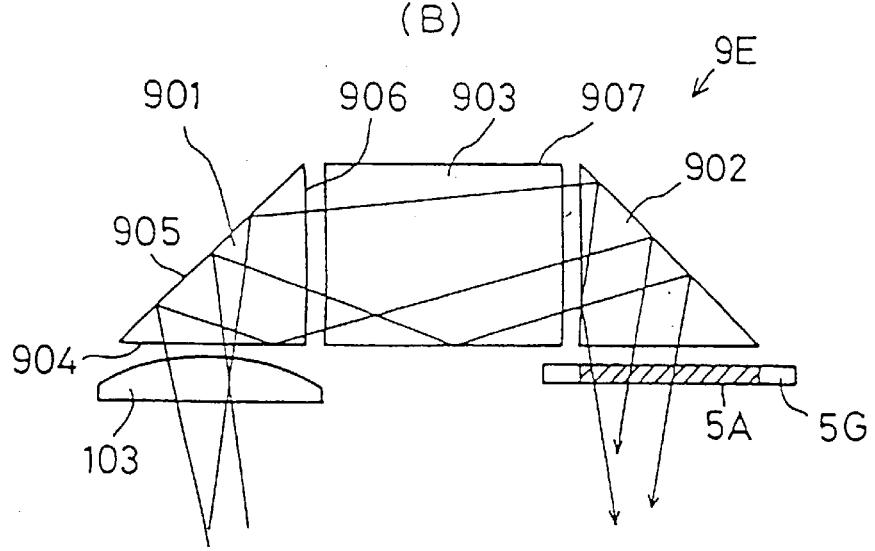
Figure 10:
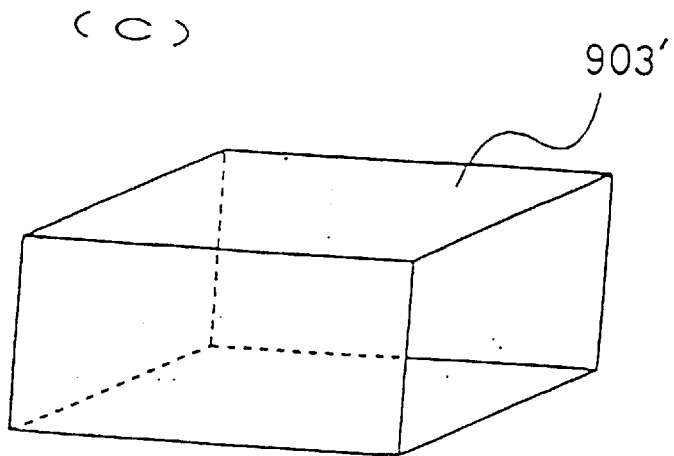
Figure 10:
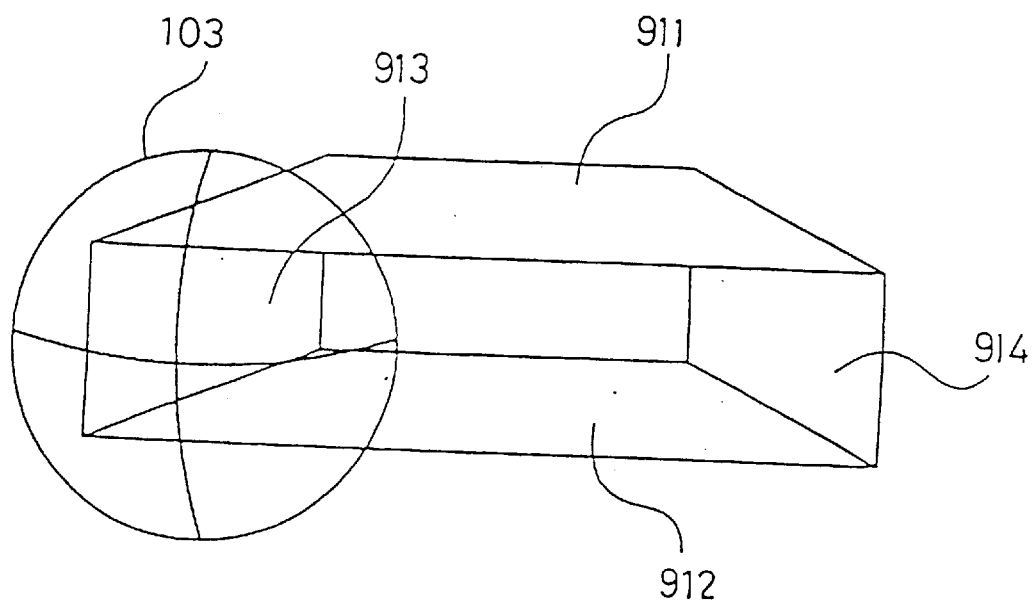

FIG. 10(A) illustrates a projection-type display apparatus according to a second embodiment of the present invention. A projection-type display apparatus 100 in this embodiment is the same as the above-mentioned projection-type display apparatus 1 in the first embodiment except for the structure of a light guide system. Therefore, like components are denoted by like numerals, and the explanation thereof is omitted.

A light guide system 9E in the projection-type display apparatus 100 of this embodiment is constituted by an incident side triangular prism 901, an output side triangular prism 902 and a quadratic prism 903 located between the triangular prisms 901 and 902.

The operation of the light guide system 9E in this embodiment will be described with reference to FIG. 10(B). A light beam collimated by the condenser lens 103 vertically enters an incident plane 904 of the triangular prism 901, is reflected by a total reflection plane 905, and output from an outputting plane 906. The total reflection plane 905 may be an optical flat surface merely made of glass or plastic. However, if the incident beam includes a light beam of an angle which is not totally internally reflected, it is preferable that the total internal reflection plane 905 be coated with a metal film, such as aluminum, silver and so on. Instead, coating with a dielectric multilayer reflective film may be conducted. Since the incident plane 904 and the outputting plane 906 serve to guide light by total internal reflection, as illustrated, each of them should be an interface between air and the glass material, and cannot be in contact with adjacent optical elements. Therefore, it is necessary that the five planes of the triangular prism 901 be optically flat planes and, in some cases, the incident plane 904 and the outputting plane 906 thereof should have a reflection attenuation coating applied thereto. In particular, it is preferable that a non-reflection coating be applied to the interface between the triangular prism 901 and the adjacent quadratic prism 903.

The six planes of the quadratic prism 903 should all be optically flat planes. The four planes 907 parallel to a main axis of the beam passing therethrough guide the light beam by total internal reflection. The triangular prism 902 on the output side of the quadratic prism 903 has the same structure as that of the triangular prism 901 on the incident side. The emitted beam enters the display area 5A of the liquid crystal panel 5G.

Figure 3:
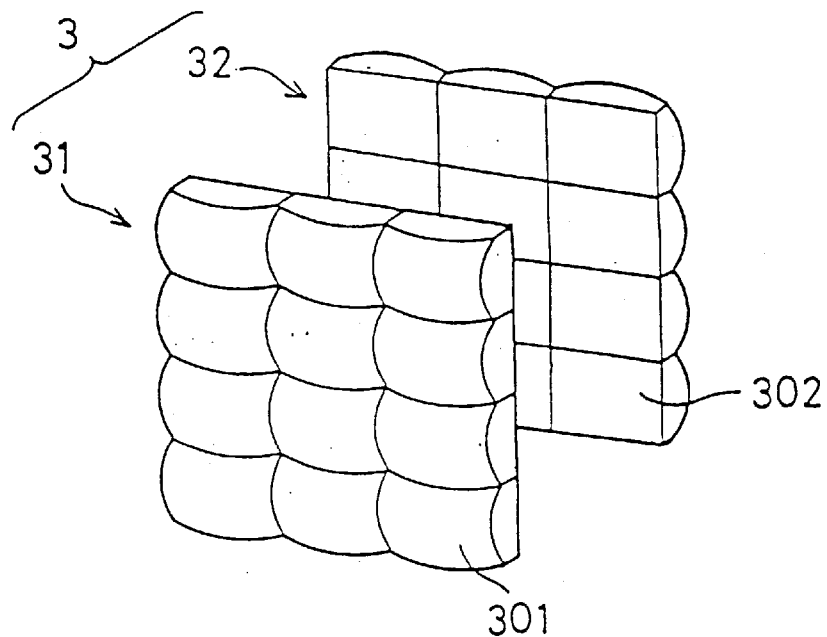
FIGS. 3(A), (B) and (C) are schematic perspective views showing the structure of first and second lens plates constituting a uniform illumination optical device as shown in FIG. 1.
Figure 3:
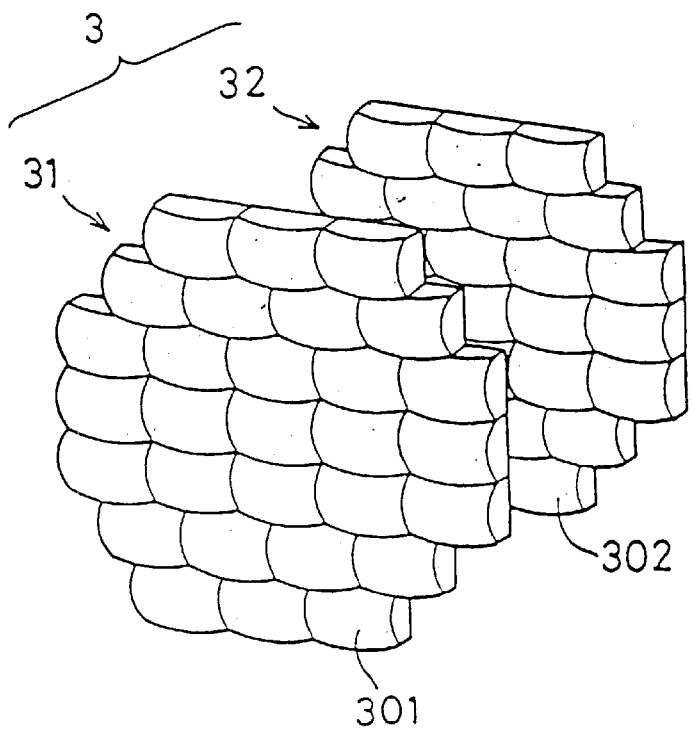

In order to enhance the transfer rate of the beam, the shape of the incident surface 904 of the triangular prism 901, and the shape of the emitting plane of the triangular prism 902 are almost the same as the rectangular shape of the display area 5A of the liquid crystal panel 5G. A uniform illumination optical device 3 of the illumination optical system is, as shown in FIG. 3, constituted by first and second lens plates 31 and 32, each of which has rectangular lenses arranged in a matrix. Therefore, the incident surface 904 of the incident side triangular prism 901 is almost uniformly illuminated in relation to the rectangular shape thereof. The three prisms transfer the incident beam to the display area 5A of the liquid crystal panel 5G while maintaining the amount of light, the collimated state, and uniform brightness distribution of the incident beam. Though it is necessary to locate the triangular prism 902 on the output side and the liquid crystal panel 5G close to each other, if there is a distance which between them cannot be ignored, a prism or a lens for light guiding may be additionally provided.

The same advantage as that of the above-mentioned first embodiment can be obtained by the projection-type display apparatus having such constitution in this embodiment. Instead of the quadratic prism 903 of the light guide system in this embodiment, for example, a cylindrical light guide member formed from the combination of four reflecting mirrors may be employed.

The quadratic prism 903 shown in FIG. 10(B) may be replaced with a cylindrical light guide system constituted by four reflectivity mirrors 903', as shown in FIG. 10(C). Though the reflectance of the light guide surfaces is slightly lowered, the operation is not changed. As shown in FIG. 10(D), the light guide system may also be constituted by two upper and lower reflecting plates 911 and 912, and two reflecting mirrors 913 and 914, for folding the optical path. In this case, though the incident beam cannot be transferred without a loss in the amount of light, the loss amount can be reduced to some extent by shortening the focal length of the lens 103. Since the illumination distribution also cannot be maintained, this method is suited to the uniform illumination optical device using the cylindrical lenses shown in FIG. 3(C).

Third Embodiment

Figure 14:
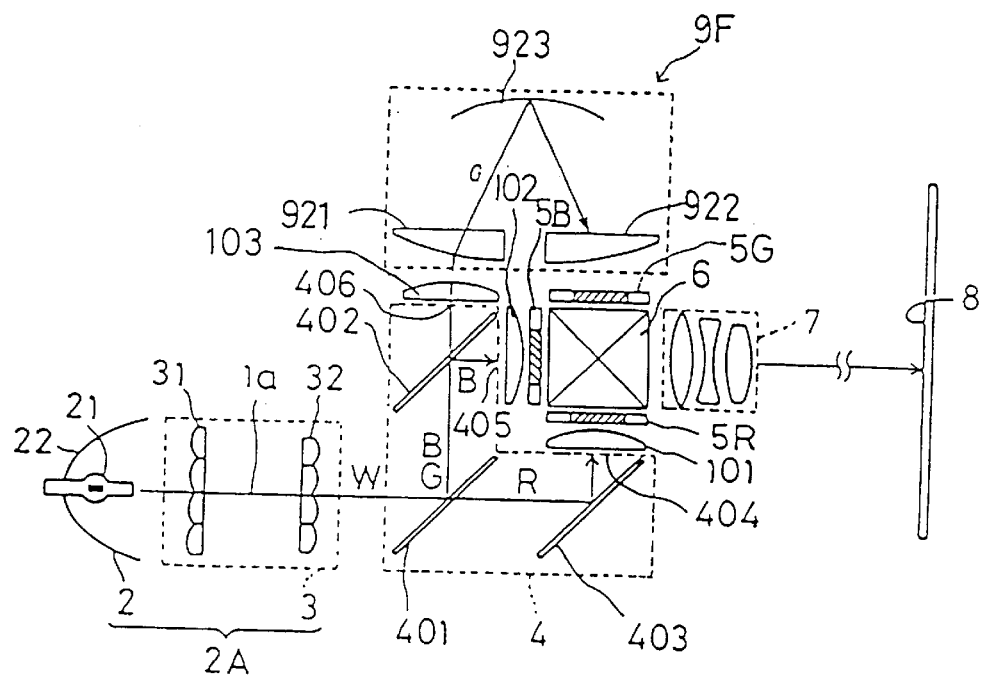
FIGS. 14(A) and (B) are schematic structural views showing a projection-type display apparatus according to a third embodiment of the present invention, and a variation thereof.
Figure 14:
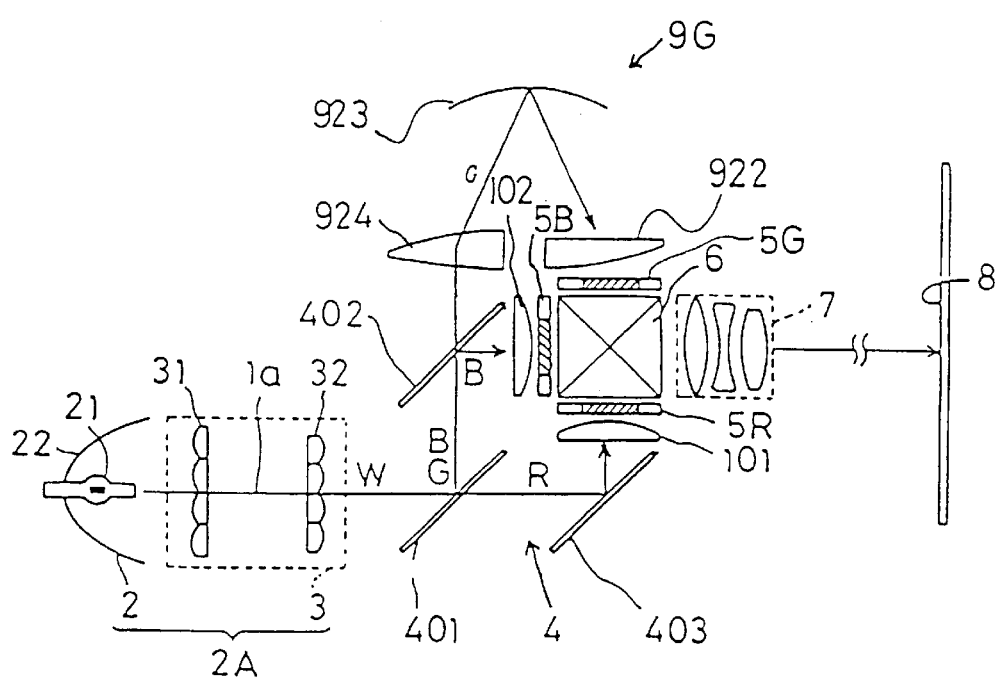

FIG. 14(A) illustrates a projection-type display apparatus according to a third embodiment of the present invention. A projection-type display apparatus 500 in this embodiment is the same as the above-mentioned one of the first embodiment, except for the structure of a light guide system thereof. Therefore, like components are denoted by like numerals, and the explanation thereof is omitted.

A light guide system 9F in the projection-type display apparatus 500 of this embodiment is comprised of a field lens 921 which acts as an incident lens on the incident side, a field lens 922 which acts as an incident lens on the output side and a concave mirror 923. A condenser lens 103 adjacent to the incident portion of the light guide system 9F and the field lens 921 may be combined into a single lens.

A light guide system 9G having such structure is illustrated in FIG. 14(B). An integrally formed lens 924 consists of a decentered double-convex lens as illustrated.

Figure 15:
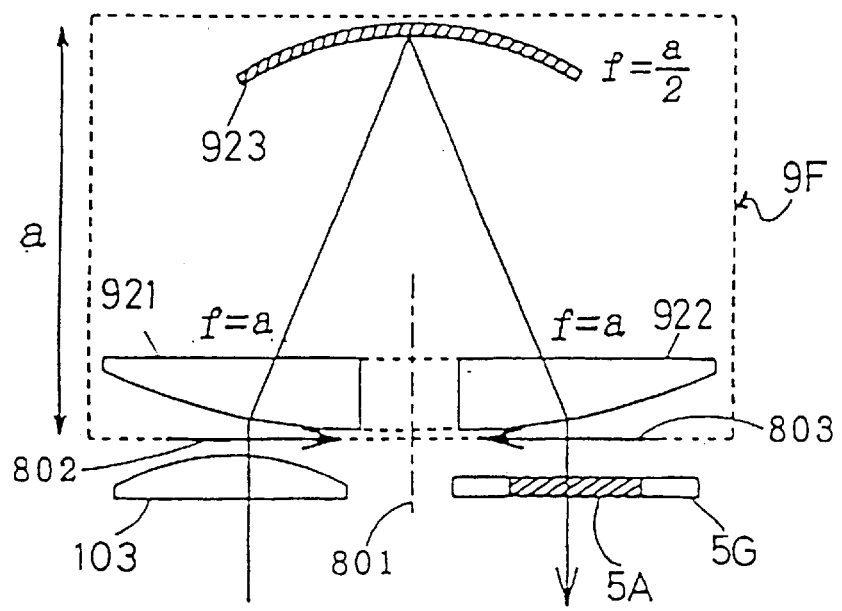
FIG. 15(A) is an explanatory view of a light guide system as shown in FIG. 14(A)
FIG. 15(B) is an explanatory view of a variation of the light guide system shown in FIG. 15(A).
Figure 15:
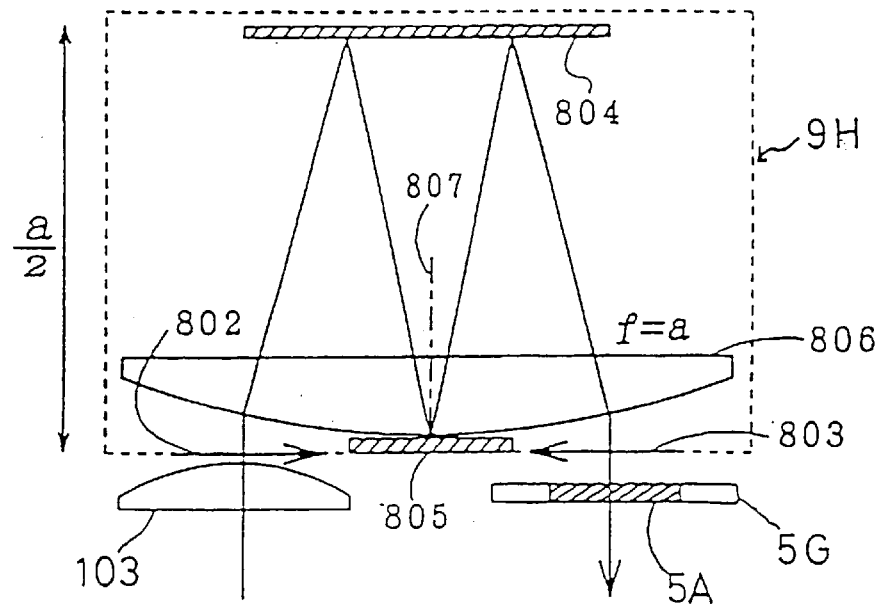

A concrete structure of the above-mentioned light guide system 9F is shown in FIG. 15(A). If it is assumed that a distance between the concave mirror 923 located in the center of the optical path and the field lens 921 or 922 is a, the focal length of the concave mirror 923 is almost equal to a/2. The curved surface of the concave mirror 923 is spherical or elliptical. Therefore, the concave mirror 923 forms an image of an object 802 in the incident portion on the emitting portion as a reflected image 803, and in fact, the illumination distribution in the incident portion is reversed in the emitting portion. The field lenses 921 and 922 each have a focal length equal to a, and optical axes 801 thereof coincide with each other in the center therebetween. The incident side field lens 921 focuses a collimated beam from the condenser lens 103 onto the center of the concave mirror 923. The output side field lens 922 refracts the reflected beam from the concave mirror 923 so as to be perpendicular to a liquid crystal panel 5G.

The light guide system 9F may be structured as shown in FIG. 15(B). In a light guide system 9H shown in the figure, two field lenses 921 and 922 in the above light guide system 9E are replaced by a single lens 806, the concave mirror 923 is replaced by a plane mirror 804 which is located at a distance of a/2 from the lens 806. Furthermore, a plane mirror 805 is arranged perpendicular to an optical axis 807 of the lens 806. A collimated beam incident on the light guide system 9H is reflected by the plane mirror 804 through an end portion of the lens 806, and focused onto the center of the plane mirror 805. The beam reflected by the plane mirror 805 is reflected by the plane mirror 804, passes through an end portion of the lens 806, and perpendicularly enters a display area 5A of a liquid crystal panel 5G. An image of an object 802 on the incident side is formed as a reflected image 803 by the center of the lens 806. Since the beam passes through the center of the lens 806 twice, it is the same as the case the beam passes through a lens having a focal length of a/2. The constitution of this embodiment has an advantage in making the size of the apparatus smaller than that in use of the above-mentioned light guide system 9F.

Fourth Embodiment

Figure 11:
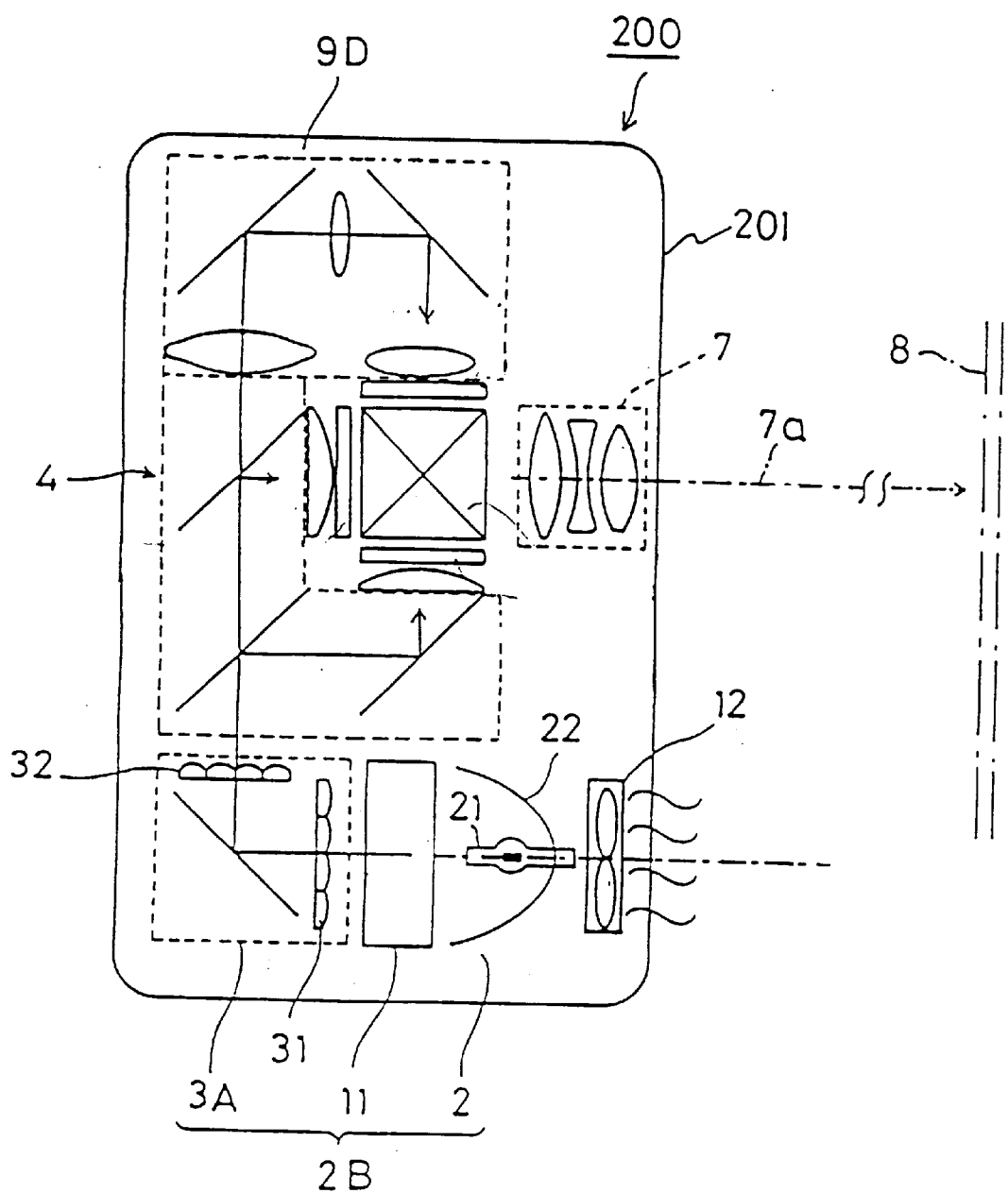
FIG. 11 is a schematic structural view showing an optical system and a cooling fan of a projection-type display apparatus according to a fourth embodiment of the present invention.

FIG. 11 illustrates a projection-type display apparatus according to a fourth embodiment of the present invention. A projection-type display apparatus 200 in this embodiment is contrived so as to compactly house an optical system in a case 201. The optical system in this embodiment is constituted by an illumination optical system 2B, a color separating optical system 4, light valves 5R, 5G and 5B, a color synthesizing optical system 6, a projection lens 7 and a light guide system 9D. Among these components, the color separating optical system 4, the light valves 5R, 5G and 5B, the color synthesizing optical system 6 and the projection lens 7 are the same as those in the apparatus 1 of the first embodiment. The light guide system 9D is the same as that shown in FIG. 8(A). Therefore, components corresponding to the above-mentioned ones are denoted by like numerals, and the explanation thereof is omitted.

In the apparatus 200 of this embodiment, the direction of an emitted beam from a light source lamp 21 is folded at a right angle in the illumination optical system 2B so that a chief axis 1A or a beam output from the illumination optical system 2B is parallel to an optical axis 7a of the projection lens 7. The illumination optical system 2B is provided with a polarized beam conversion system 11.

In other words, the illumination optical system 2B in this embodiment is constituted by a light source 2 composed of the lamp 21 and a reflecting mirror 22, the polarized beam conversion device 11 located on the emission side of the light source 2, and a uniform illumination optical device 3A on the emission side of the polarized beam conversion device 11.

Figure 12:
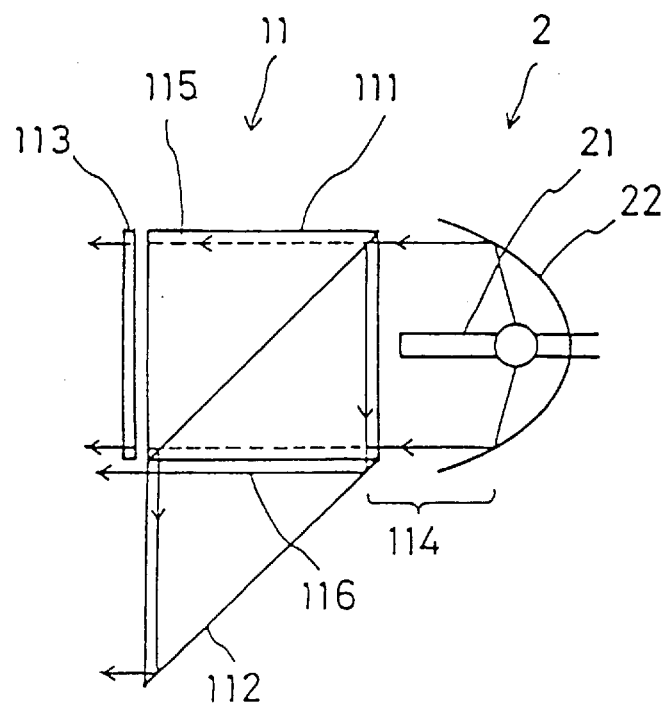
FIG. 12 is an explanatory view showing the structure of a polarized beam conversion device incorporated in the illumination optical system shown in FIG. 11.

As shown in FIG. 12, the polarized beam conversion device 11 in this embodiment is constituted by a polarizing beam splitter 111, a reflecting mirror 112, and a $\lambda/2$ phase plate 113. A random polarized beam 114 emitted from the light source 2 is separated into two linearly polarized beams, a P polarized beam 115 and an S polarized beam 116, by the polarizing beam splitter 111 which is a polarized beam separating element. Since the polarized beam separating function of the polarizing beam splitter 111 has a dependence on an incident angle, a light source provided with a lamp having a short arc length and capable of emitting a beam excellent in parallelism is suitable. When the separated P polarized beam 115 passes through the $\lambda/2$ phase plate 113 which is a polarizing plane rotating element, a polarization plane thereof is turned at an angle of 90° and the P polarized beam 115 is converted into an S polarized beam. On the other hand, the S polarized beam 116 is output as it is while an optical path thereof is merely folded by the prismatic reflecting mirror 112. In this embodiment, the reflecting mirror 112 is made of, for example, an aluminum evaporated film. Since the reflecting mirror 112 has a higher reflectivity rate for an S polarized beam than that for a P polarized beam, the optical path of the S polarized beam is folded by the reflecting mirror 112. As the reflecting mirror 112, an ordinary plane reflecting mirror may be used instead of such prismatic mirror. The random polarized beam 114 from the light source is outputted as an S polarized beam by passing through the polarized beam conversion device 11 having such structure. Though the P polarized beam is converted into the S polarized beam in this embodiment, it is also allowable for the S polarized beam to be converted into a P polarized beam, and the P polarized beam to be emitted from the polarized beam conversion device 11.

The uniform illumination optical device 3A located on the output side of the polarized beam conversion device 11 is comprised of a first lens plate 31 located on a plane perpendicular to the chief axis of the output S polarized beam 116, a second lens plate 32 orthogonal to the first lens plate 31, and a reflecting mirror 33 located between the lens plates 31 and 32 for folding the optical path at a right angle. The first and second lens plates each have the same structure as that in the first embodiment. The light beam incident on the uniform illumination optical device 3A is thus folded at a right angle and output. The output white S polarized beam is separated into beams of primary colors by the color separating optical system 4. The separated color beams are synthesized by the color synthesizing optical system 6 comprising a dichroic prism, and magnified and projected onto a screen 8 through the projection lens 7 under magnification.

As mentioned above, the optical path is formed in the apparatus 200 of this embodiment so that the direction of the projection beam is parallel and reverse to the emission direction of the illumination optical system 2B, and a cooling fan 12 for restricting heat generation of the light source lamp 21 is located on the back side of the light source 2 in the case 201.

Therefore, air heated by cooling is exhausted in the same direction as the projection beam in the apparatus 200 of this embodiment. When an image is displayed on a reflection-type screen to be viewed while using this projection-type display apparatus as a front projector, a viewer is ordinarily present behind the apparatus. Therefore, it is advantageous in preventing the seeing and hearing of the viewer from being disturbed by the noise of the cooling fan or the exhausted warm air. Furthermore, if the apparatus is installed in a place whose space is relatively tight, such as an audio rack, since air is exhausted from the front thereof, the air is not exhausted into closed areas, which is convenient.

In the apparatus 200 of this embodiment, the illumination optical system 2B is provided with the polarized beam conversion device 11. Therefore, the random polarized beam emitted from the light source is converted into two specific linearly polarized beams, and the converted beams are efficiently superposed and output with little loss incident to the emission. The system can realize a bright illumination and is capable of outputting polarized beams at high efficiency. Furthermore, since the output polarized beams pass through the uniform illumination optical device 3A in this embodiment, unevenness in color and luminous intensity caused in the light source is restricted, and illumination light of high uniformity can be obtained.

As described above, the projection-type display apparatus of the present invention comprises, an illumination optical system having a uniform illumination optical device, a color synthesizing system utilizing a dichroic prism, a light guide system located on the optical path of a color beam having the longest optical path length in a color separating system. Emitted color beams separated through the color separating system are collimated by condenser lenses and applied onto light valves. Therefore, according to the present invention, unevenness in color and luminous intensity of light from a light source is restricted by the uniform illumination optical device. The color synthesizing system is a prism composite system which causes less unevenness in color and luminous intensity than a mirror composite system, and therefore, the unevenness in color and luminous intensity hardly arises therein. Furthermore, since light of the color beam having the longest optical path length is transmitted with little loss in the amount of light through the light guide system, and the collimated beams are applied onto the light valves by the condenser lenses, the loss in the amount of light is small, and the illumination efficiency is enhanced. Therefore, according to the present invention, it is possible to realize a projection-type display apparatus which causes less unevenness in color and luminous intensity than ever, and the apparatus has a high illumination efficiency.

In the present invention, the focal lengths of the lenses, which are components of the light guide system, are set at appropriate values, or prisms are used as the light guide system. According to this constitution, since unevenness in color and loss in the amount of light in the light guide system can be restricted, it is possible to form a projection image having little unevenness in color and a high illumination efficiency.

Furthermore, in the present invention, a dichroic prism, which is an element rotationally symmetrical about the chief axis of the projection optical system, is used as the color synthesizing system. A liquid crystal panel having a small pixel pitch of less than approximately 50 μm is used as a light valve. Therefore, according to the present invention, it is possible to form a projection image of high resolution, and to downsize the whole apparatus by employing a liquid crystal panel using a polysilicon TFT or the like, which is easy to make compact.

Since the split number of the lens plates constituting the uniform illumination optical device is set to be within a range of 3 to 7 in the present invention, it is possible to form a projection image whose unevenness in color is restricted.

Still furthermore, since the illumination optical system is provided with a polarized beam conversion device in the present invention, it is possible to restrict the emission loss of the light emitted from the light source lamp, and therefore, to form a bright projection image.

In addition, the optical path is formed in the projection-type optical system of the present invention so that the projection light can be output in the direction reverse and parallel to the direction of the light beam emitted from the illumination optical system. A cooling means for the light source lamp is located on the output side of the projection light in the apparatus case. According to such constitution, when the display apparatus is used as a front projector, the cooling means is located on the side opposite a viewer of the projection image, and air from the cooling means is exhausted to the side opposite the viewer. Therefore, the arrangement is advantageous in preventing the noise and exhausted air from the cooling means from disturbing the viewer.

In addition, according to the present invention, besides the above advantages, since a back focus of the projection lens of the optical system is short, a large-scale projection at a short distance is easy to perform. Therefore, it is possible to realize a projection-type display apparatus suitable for presentation use and home theater use. Furthermore, since the back focus of the projection lens is short, it is possible to realize a projection lens having a small F number by a small number of lenses, and therefore, to lower the production cost of the apparatus.

What is claimed is:

1. A projection-type display apparatus, comprising:
   a light source;
   color separating means for separating a light beam emitted from said light source into a plurality of color beams;
   a plurality of light valves for modulating said separated color beams;
   light guide means located on an optical path of a color beam having a longest optical path length, the color beams being separated by said color separating means and respectively incident on said light valves;
   color synthesizing means for synthesizing a projection beam from said color beams modulated through said light valves;
   a projection lens for projecting said projection beam into a screen;
   uniform illumination optical means interposed on an optical path between said light source and said color separating means for converting said light beam emitted from said light source into a uniform beam; and
   a plurality of condenser lenses located respectively in outputting portions of said color separating means for outputting said color beams, the condenser lenses converting said color beams separated by said color separating means into almost collimated beams, said light guide means having one intermediate lens, and a focal length of said intermediate lens is within a range of approximately 0.9 to 1.1 times the optical path length of said light guide means.

2. A projection-type display apparatus, comprising:
   a light source;
   color separating means for separating a light beam emitted from said light source into a plurality of color beams;
   a plurality of light valves for modulating said separated color beams;
   light guide means located on an optical path of a color beam having a longest optical path length, the color beams being separated by said color separating means and respectively incident on said light valves;
   color synthesizing means for synthesizing a projection beam from said color beams modulated through said light valves;
   a projection lens for projecting said projection beam into a screen;
   uniform illumination optical means interposed on an optical path between said light source and said color separating means for converting said light beam emitted from said light source into a uniform beam; and
   a plurality of condenser lenses located respectively in outputting portions of said color separating means for outputting said color beams, the condenser lenses converting said color beams separated by said color separating means into almost collimated beams, said light guide means including an incident lens located on an incident side of an incident side reflecting mirror, an output lens located on an output side of an output side reflecting mirror, and an intermediate lens located between said incident and output side reflecting mirrors, focal lengths of said incident and output side lenses being within a range of approximately 0.5 to 0.7 times the optical path length of said light guide means, and the focal length of said intermediate lens being within a range of approximately 0.25 to 0.4 times the optical path length of said light guide means.

3. A projection-type display apparatus according to claim 2, wherein said incident lens of said light guide means and one of said condenser lenses are combined into a single lens.

4. A projection-type display apparatus according to claim 3, wherein said single lens is an aspherical lens.

5. A projection-type display apparatus, comprising:
   a light source
   color separating means for separating a light beam emitted from said light source into a plurality of color beams, at least one of the color beams having an optical path that is longer than optical paths of other color beams;
   a plurality of light valves for modulating said separated color beams;
   light guide means located on an optical path of a color beam having a longest optical path length, said color beams being separated by said color separating means and respectively incident on said light valves;

color synthesizing means for synthesizing a projection beam from said color beams modulated through said light valves;

a projection lens for projecting said projection beam onto a screen; and uniform illumination optical means interposed on an optical path between said light source and said color separating means for converting said light beam emitted from said light source into a uniform beam, said uniform illumination optical means further including a reflecting mirror interposed between said first and said second lens plates.

6. A projection-type display apparatus, comprising:

a light source color separating means for separating a light beam emitted from said light source into a plurality of color beams, at least one of the color beams having an optical path that is longer than optical paths of other color beams;

a plurality of light valves for modulating said separated color beams;

light guide means located on an optical path of a color beam having a longest optical path length, said color beams being separated by said color separating means and respectively incident on said light valves;

color synthesizing means for synthesizing a projection beam from said color beams modulated through said light valves;

a projection lens for projecting said projection beam onto a screen; and uniform illumination optical means interposed on an optical path between said light source and said color separating means for converting said light beam emitted from said light source into a uniform beam, said uniform illumination optical means further including a reflecting mirror interposed between said first and said second lens plates.

7. A projection-type display apparatus, comprising:

a light source emitting a light beam;

a uniform illumination optical device that converts said light beam emitted from said light source into a uniform beam;

a color separating optical system that separates the beam emitted from said light source into a plurality of color beams;

a plurality of condenser lenses located respectively in outputting portions of said color separating optical system, the condenser lenses converting said color beams into almost collimated beams;

a plurality of light valves that modulate said separated color beams;

a light guide system located on an optical path of a color beam having a longest optical path length; and a color synthesizing system that synthesizes said color beams into a projection beam, said light guide system including an intermediate lens, and a focal length of said intermediate lens being within a range of approximately 0.9 to 1.1 times an optical path length of said light guide system.

8. A projection-type display apparatus, comprising:

a light source emitting a light beam;

a uniform illumination optical device that converts said light beam emitted from said light source into a uniform beam;

a color separating optical system that separates the beam emitted from said light source into a plurality of color beams;

a plurality of condenser lenses located respectively in outputting portions of said color separating optical system, the condenser lenses converting said color beams into almost collimated beams;

a plurality of light valves that modulate said separated color beams;

a light guide system located on an optical path of a color beam having a longest optical path length; and a color synthesizing system that synthesizes said color beams into a projection beam, said light guide system including an incident lens located on an incident side of an incident side reflecting mirror, an output lens located on an output side of an output side reflecting mirror, and an intermediate lens located between said incident and output side reflecting mirrors, focal lengths of said incident and output side lenses being within a range of approximately 0.5 to 0.7 times an optical path length of said light guide system, and a focal length of said intermediate lens being within a range of approximately 0.25 to 0.4 times the optical path length of said light guide system.

9. The projection-type display apparatus according to claim 8, wherein said incident lens of said light guide system and one of said condenser lenses are combined into a single lens.

10. A projection-type display apparatus according to claim 9, wherein said single lens is an aspherical lens.

11. A projection-type display apparatus, comprising:

a light source emitting a light beam;

a uniform illumination optical device that converts said light beam emitted from said light source into a uniform beam;

a color separating optical system that separates the beam emitted from said light source into a plurality of color beams;

a plurality of condenser lenses located respectively in outputting portions of said color separating optical system, the condenser lenses converting said color beams into almost collimated beams;

a plurality of light valves that modulate said separated color beams;

a light guide system located on an optical path of a color beam having a longest optical path length; and a color synthesizing system that synthesizes said color beams into a projection beam, said uniform illumination optical device further including a reflecting mirror interposed between first and said second lens plates.

12. A projection-type display apparatus, comprising:

a light source emitting a light beam;

a uniform illumination optical device that converts said light beam emitted from said light source into a uniform beam;

a color separating optical system that separates the beam emitted from said light source into a plurality of color beams, at least one of the color beams having an optical path that is longer than optical paths of other color beams;

a plurality of light valves that modulate said separated color beams;

a light guide system located on an optical path of the color beam having a longest optical path length; and a color synthesizing system that synthesizes said color beams into a projection beam, said uniform illumination optical device further including a reflecting mirror interposed between first and said second lens plates.

13. A projection-type display apparatus, comprising:

a light source emitting a light beam;

a color separating optical system that separates the light bean emitted from said light source into a plurality of color beams;

a plurality of light valves that modulate said separated color beams;

a light guide system located on an optical path of the color beam having a longest optical path length, the light guide system including an intermediate lens, a focal length of said intermediate lens being within a range of approximately 0.9 to 1.1 times an optical path length of said light guide system; and a color synthesizing system that synthesizes said color beams into a projection beam.

14. The projection-type display apparatus of claim 13, further comprising a projection lens that projects said projection beam.

15. A projection-type display apparatus, comprising:

a light source emitting a light beam;

a color separating optical system that separates the light beam emitted from said light source into a plurality of color beams;

a plurality of light valves that modulate said separated color beams;

a light guide system located on an optical path of the color beam having a longest optical path length, the light guide system including an incident lens located on an incident side of an incident side reflecting mirror, an output lens located on an output side of an output side reflecting mirror, and an intermediate lens located between said incident and output side reflecting mirrors, focal lengths of said incident and output side lenses being within a range of approximately 0.5 to 0.7 times an optical path length of said light guide system, and a focal length of said intermediate lens being within a range of approximately 0.25 to 0.4 times the optical path length of said light guide system; and a color synthesizing system that synthesizes said color beams into a projection beam.

16. The projection-type display apparatus of claim 15, further comprising a projection lens that projects said projection beam.

* * * * *

UNITED STATES PATENT AND TRADEMARK OFFICE
CERTIFICATE OF CORRECTION

| | |
|---|---|
| PATENT NO. | : 6,120,152 |
| DATED | : September 19, 2000 |
| INVENTOR(S) | : Tadaaki Nakayama, Yoshitaka Itoh and Akitaka Yajima |

It is certified that error appears in the above-identified patent and that said Letters Patent is hereby corrected as shown below:

<u>Title page,</u>
Item [30] insert:

-- Foreign Application Priority Data

March 16, 1993 [JP] Japan ..................... 5-55952 --

Signed and Sealed this

Twenty-fifth Day of September, 2001

Attest:

*Nicholas P. Godici*

NICHOLAS P. GODICI
*Attesting Officer*     *Acting Director of the United States Patent and Trademark Office*